(12) United States Patent
Marco et al.

(10) Patent No.: US 9,019,885 B2
(45) Date of Patent: Apr. 28, 2015

(54) DATA NETWORKING THROUGH INHERENT RF CONNECTIONS IN A COMMUNICATION SYSTEM

(71) Applicant: Shure Acquisition Holdings, Inc., Niles, IL (US)

(72) Inventors: Todd P. Marco, Chicago, IL (US); Scott N. Brumm, Chicago, IL (US); Steven M. Grad, Northbrook, IL (US); Mark Allen Kenkel, Schaumburg, IL (US); Irwin Preet Singh, Prospect Heights, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 191 days.

(21) Appl. No.: 13/623,950

(22) Filed: Sep. 21, 2012

(65) Prior Publication Data
US 2013/0016647 A1 Jan. 17, 2013

Related U.S. Application Data

(63) Continuation-in-part of application No. 12/626,105, filed on Nov. 25, 2009, now Pat. No. 8,843,075.

(60) Provisional application No. 61/249,438, filed on Oct. 7, 2009.

(51) Int. Cl.
*H04H 20/71* (2008.01)
*H04B 1/20* (2006.01)

(52) U.S. Cl.
CPC ............ *H04B 1/205* (2013.01); *H04R 2410/00* (2013.01); *H04R 2420/07* (2013.01)

(58) Field of Classification Search
None
See application file for complete search history.

(56) References Cited

U.S. PATENT DOCUMENTS 2,962,659 A 11/1960 Neill
4,314,373 A * 2/1982 Sellers ............................. 455/73

(Continued)

FOREIGN PATENT DOCUMENTS

EP 1422884 A1 5/2004
EP 2219322 A1 8/2010

(Continued)

OTHER PUBLICATIONS

International Search Report from related PCT Application PCT/US2010/051649 mailed on Feb. 8, 2011.

(Continued)

*Primary Examiner* — Dang Ton
*Assistant Examiner* — Ronald h Davis
(74) *Attorney, Agent, or Firm* — Banner & Witcoff, Ltd.

(57) ABSTRACT

An RF distribution system distributes a radio frequency (RF) signal to a plurality of receivers. Ports provide RF connectivity from the antennas to the receivers while also providing data connectivity between the receivers. Sensors detect which receivers are connected to the distribution system so that the distribution system can route data from the first detected receiver to the other detected receivers and back to the first detected receiver. The distribution system can dynamically alter the routing if the receiver configuration changes. Consequently, a receiver can send data to other receivers through A-ports and B-ports of a radio distribution system. The A-ports provide RF connectivity to a first antenna while the B-ports provide RF connectivity to a second antenna. Different commands for locking, unlocking, scanning RF spectrum, and configuring can be sent between the receivers via the A-ports and B-ports through the RF distribution system.

30 Claims, 25 Drawing Sheets

(56) References Cited

U.S. PATENT DOCUMENTS

| | | | |
|---|---|---|---|
| 4,955,021 A * | 9/1990 | Wei | 370/401 |
| 6,801,767 B1 * | 10/2004 | Schwartz et al. | 455/426.2 |
| 8,219,374 B1 | 7/2012 | Batarseh et al. | |
| 2002/0023234 A1 | 2/2002 | Berman | |
| 2003/0157916 A1 | 8/2003 | Kamimura | |
| 2004/0131201 A1 * | 7/2004 | Hundal et al. | 381/77 |
| 2004/0170128 A1 | 9/2004 | Takamichi | |
| 2005/0207352 A1 | 9/2005 | Schmidt | |
| 2008/0049627 A1 | 2/2008 | Nordin | |
| 2009/0009296 A1 * | 1/2009 | Shafer | 340/10.1 |
| 2010/0325671 A1 | 12/2010 | Jaramillo | |
| 2011/0080847 A1 | 4/2011 | Kenkel et al. | |
| 2011/0249831 A1 * | 10/2011 | Bellamy | 381/94.1 |
| 2012/0051302 A1 * | 3/2012 | Seki | 370/329 |
| 2012/0120313 A1 * | 5/2012 | Green et al. | 348/485 |

FOREIGN PATENT DOCUMENTS

| | | |
|---|---|---|
| EP | 2469776 A1 | 6/2012 |
| JP | 07236096 | 9/1995 |
| JP | 2002223266 A | 8/2002 |
| JP | 2003244008 A | 8/2003 |
| JP | 2004320683 A | 11/2004 |
| JP | 2007158392 A | 6/2007 |

OTHER PUBLICATIONS

Partial International Search Report from related PCT Application PCT/US2013/051870 mailed on Nov. 7, 2013; pp. 1-5.

International Search Report from related PCT Application PCT/US2013/051870 mailed on Feb. 25, 2014; pp. 1-18.

* cited by examiner

DATA NETWORKING THROUGH INHERENT RF CONNECTIONS IN A COMMUNICATION SYSTEM

This application is a continuation-in-part of co-pending U.S. patent application Ser. No. 12/626,105 entitled "Self-Discovery of an RF Configuration for a Wireless System" and filed on Nov. 25, 2009, the entire disclosure of which is hereby incorporated by reference. Application Ser. No. 12/626,105 claims priority to provisional Application Ser. No. 61/249,438 filed Oct. 7, 2009, which is incorporated by reference in its entirety herein.

BACKGROUND

Wireless microphone receivers are often connected to a coaxial antenna distribution system. The receivers are typically connected to a distribution amplifier and may be connected to one another in a cascaded fashion though a series of coaxial cables. The assigned frequency ranges of the receivers may be controlled though networking protocols such as Ethernet. If the distribution amplifier and the associated receivers are configured to different filter bands, the mismatch may cause poor or inoperable system performance. Moreover, the distribution system may not operate properly if the components are not correctly connected.

SUMMARY

This summary is provided to introduce a selection of concepts in a simplified form that are further described below in the Detailed Description. This Summary is not intended to identify key features or essential features of the disclosure.

An RF distribution system (e.g., wireless microphone receivers, scanner, antenna distribution system, or any system containing some or all of the components described herein) determines its configuration and verifies the consistency of the determined configuration. A first RF component in the distribution system modulates a signal on a first port. If a second RF component detects a modulated signal on a second port, then a processor deems that the two RF components are connected together. When the configuration has been determined by the processor, the RF distribution may further verify whether the configuration is consistent (e.g., whether connected components operate on the same band and whether all components are connected to at least one other component).

With another aspect of the disclosure, an RF distribution system instructs a first RF component of an RF distribution system to provide a generated signal. If an indication from a second RF component is detected, the RF distribution system determines that the first RF component and the second RF component are electrically connected. The procedure is repeated for the remaining RF components so that the RF configuration of the RF distribution system may be determined. The first RF component may modulate the generated signal by changing a DC voltage level or with a tone.

With another aspect of the disclosure, the RF distribution system may individually instruct each RF component to provide a generated signal based on a device identifier of each RF component. The device identifier may be obtained from device addressing supported by the supported protocol, including Ethernet, USB, and Zigbee.

With another aspect of the disclosure, the determined RF configuration may be verified for operational consistency. For example, verification may verify consistency of the bands for connected RF components, verify that each RF component in the RF distribution system is connected to another component, and verify that each RF component is connected to a preceding RF component and a succeeding RF component when the RF component is not an endpoint of the RF configuration.

With another aspect of the disclosure, an RF distribution system scans an RF spectrum, determines a set of frequencies that provides RF compatibility with the RF distribution system based on the scanning, and configures the RF components in accordance with the set of frequencies.

With another aspect of the disclosure, an RF distribution system distributes a radio frequency (RF) signal to a plurality of receivers. Ports provide RF connectivity from the antennas to the receivers while providing data connectivity between the receivers. Sensors detect which receivers are connected to the distribution system so that the distribution system can route data from the first detected receiver to the other detected receivers and back to the first detected receiver. The distribution system can dynamically alter the routing if the receiver configuration changes.

With another aspect of the disclosure, a receiver can send data to other receivers through A-ports and B-ports of a radio distribution system. The A-ports provide RF connectivity to a first antenna while the B-ports provide B-ports to a second antenna. Different commands for locking, unlocking, scanning RF spectrum, and configuring can be sent between the receivers via the A-ports and B-ports through the RF distribution system.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Aspects of the disclosure relate to determining the configuration of a radio frequency (RF) distribution system (e.g., wireless microphone receivers, scanner, antenna distribution system, or any system containing some or all of the components described herein) and to verify the consistency of the determined configuration. A first RF component in the distribution system modulates a signal on a first port. If a second RF component detects a modulated signal on a second port, then a processor deems that the two RF components are connected together. When the configuration has been determined by the processor, the process may further verify whether the configuration is consistent (e.g., whether connected components operate on the same band and whether all components are connected to at least another component.

Figure 1:
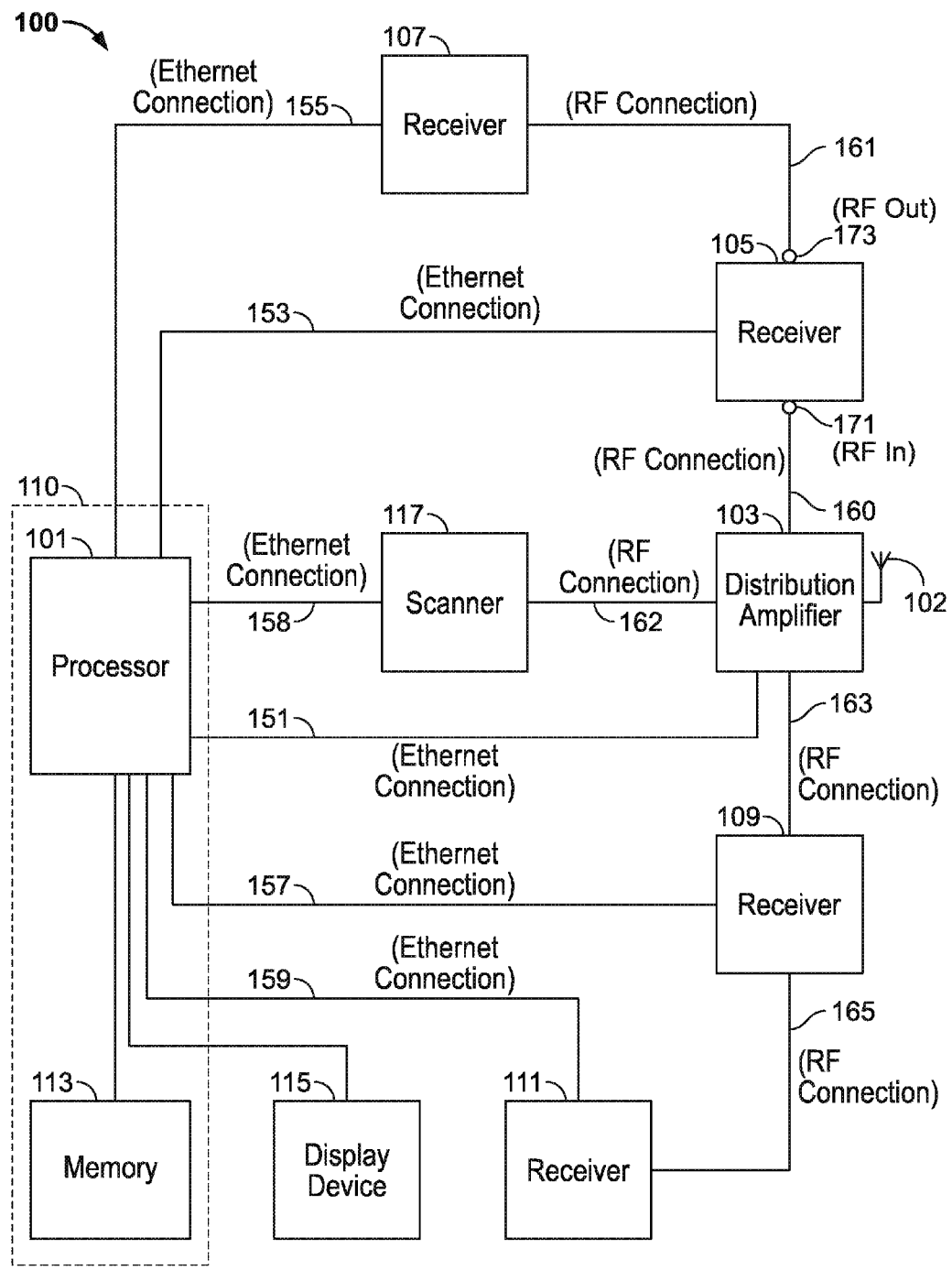
FIG. 1 shows an apparatus for supporting a wireless system in accordance with an exemplary embodiment of the invention.

FIG. 1 shows apparatus for supporting a wireless system in accordance with an exemplary embodiment of the invention. Microphone receivers 105, 107, 109, and 111 are connected in a coaxial antenna distribution system to antenna 102 through distribution amplifier 103. Receivers 105, 107, 109, and 111 and distribution amplifier 103 may be controlled though networking protocols, e.g., Ethernet, by processor 101 through Ethernet connections 153, 155, 157, 159, and 151, respectively. While FIG. 1 shows separate Ethernet connections, Ethernet connectivity is often supported through a daisy chain configuration, in which Ethernet connection is obtained through chaining devices and assigning unique addresses to each device.

If distribution amplifier 103 and associated receivers 105, 107, 109, and 111 are configured to different frequency ranges or bands (which may be referred to as "bands"), a mismatch may cause poor or inoperable system performance. A voltage source may be presented at the antenna ports of receivers 105, 107, 109, and 111 (e.g., input RF port 171 of receiver 105) and distribution amplifier 103 for use in driving line amplifiers and powered antennas. A DC voltage may be used to modulate (e.g., ON/OFF or multiple voltage levels) with a given network system command issued by processor 101 to a specific receiver through the Ethernet connection. With embodiments, the DC voltage is modulated by changing the DC component of a signal between an operational voltage level (e.g., 12 volts) and an intermediate voltage level (e.g., 10.5 volts or 13.5 volts). The modulated DC voltage may be detected by upstream receivers (e.g., at output RF port 173 if receiver 107 is modulating a signal at its input RF port), and a message may be sent over the Ethernet network by the detecting receiver that informs system processor 101 that an RF link (e.g., RF connection 160, 161, 162, 163 or 165) between these RF components has been determined (discovered). If RF components are tuned to different bands and connected together, the RF distribution system 100 may inform the user of the mismatch through system software that may display an indication on display device 115.

Other embodiments may modulate the signal at input RF port 171 in a different fashion. For example, a signal may be modulated with one or more tones or a serial/duplex data stream.

Some embodiments may send information on the signal at port 171 utilizing a simplex/duplex digital data stream (e.g., with a UART), a low speed simplex data stream, or a single pulse identifier (e.g., no formatted data with only a single identifier bit).

With the embodiment shown in FIG. 1, a receiver (e.g., receiver 105) modulates a signal on its input RF port (e.g., port 171) so that a preceding (upstream) RF component (receiver or distribution amplifier, e.g., amplifier 103) detects the modulated signal when the components are connected together through an RF link. However, with other embodiments, an RF component may modulate its output RF port (e.g., port 173) so that the successive (downstream) RF component (e.g., receiver 107) may detect the modulated signal at its input RF port.

RF distribution system 100 may also automatically configure receivers 103, 105, 107, and 109 for assigning operating frequencies within the same band. The configuration procedure may be performed after scanning the band or bands by scanner 117 and determining the set of frequencies that provide the best RF compatibility. Scanner 117 accesses the RF spectrum from distribution amplifier 103 through RF link 162 and provides information about the spectrum to processor 101 through Ethernet connection 158. Receivers that are cascaded together (e.g., receivers 105 and 107) may then be configured to the same band and programmed to individual channels within that band. System setup may appear to the user as a single operation that determines the system configuration, scans for clear frequencies, calculates compatible frequencies within frequency bands, and configures receivers to the calculated frequencies (channels).

RF distribution system 100 may determine the RF configuration at system initialization, when an RF component is added to system 100, or during operation of system 100. System 100 may be configured in response to an input from a user, cyclically (e.g., once per predetermined time interval), or automatically (e.g., when the system is initialized or when an RF component is added to RF distribution system 100).

Processor 101 may instruct an RF component to modulate a signal at its input RF port by sending a message to the RF component over the Ethernet network. Consequently, the RF component that is connected to the instructed RF component should send a message to processor 101 over the Ethernet network, informing processor 101 that the modulated signal was detected.

Processor 101 may execute computer executable instructions from a computer-readable medium, e.g., memory 113, in order perform a discovery process (any or all of the processes described herein). With some embodiments, an apparatus 110 may comprise processor 101 and memory 113. Apparatus 110 may include one or more application-specific integrated circuits (ASICs), complex programmable logic devices (CPLDs), field-programmable gate arrays (FPGAs), or other integrated circuits. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 101. The executable instructions may carry out any or all of the method steps described herein. With some embodiments, apparatus 110 (e.g., a laptop computer) may be external to the receivers, scanner, and distribution amplifiers as shown in FIG. 1. With other embodiments, apparatus 110 may be imbedded into each of the devices (e.g., receivers 105 and 107 and/or distribution amplifier 103) so that an external computer is not necessarily required.

Apparatus 100 or portions of apparatus 100 may be implemented as one or more application-specific integrated circuits (ASICs), complex programmable logic devices (CPLDs), field-programmable gate arrays (FPGAs), or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Figure 2:
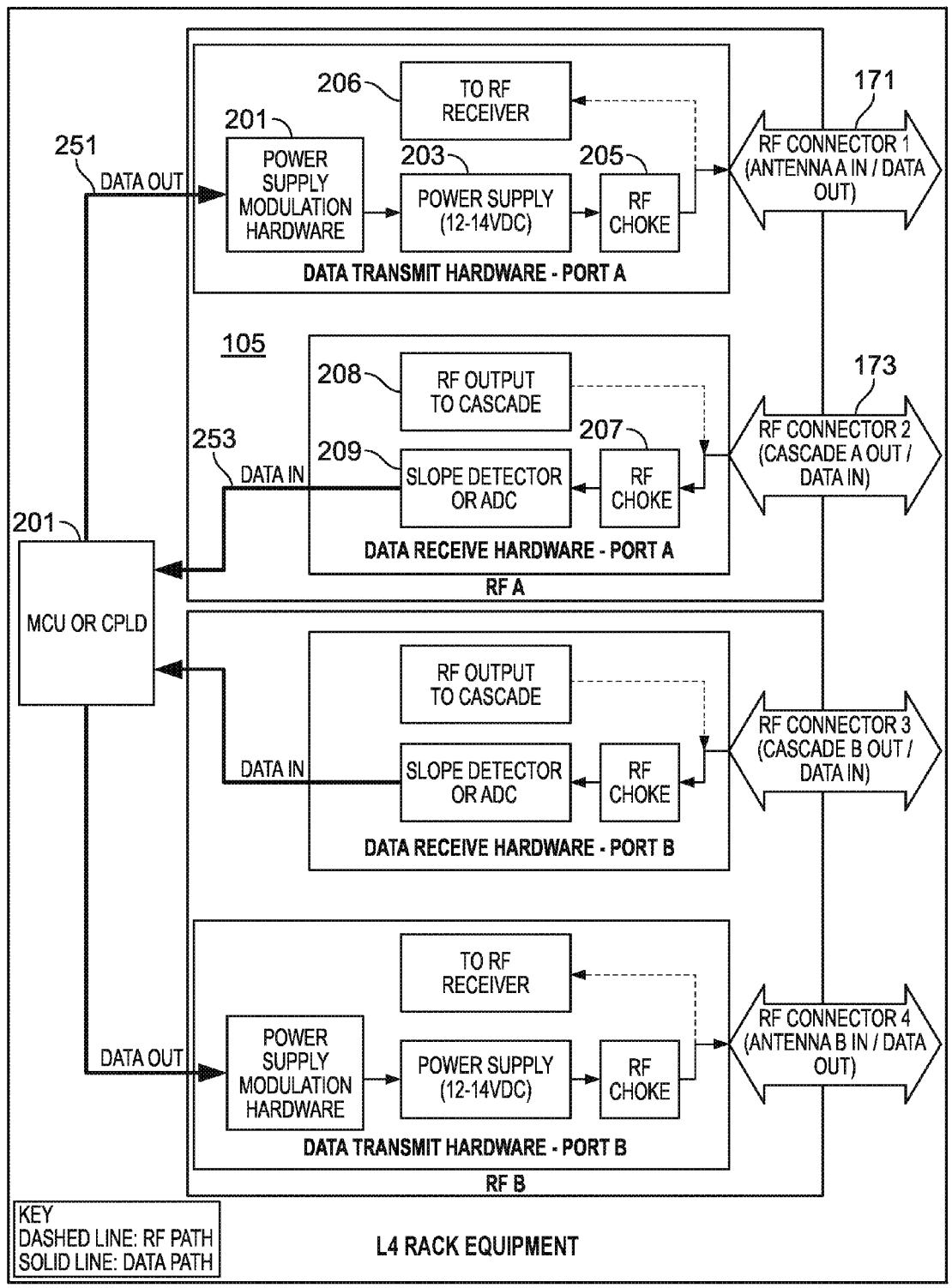
FIG. 2 shows a block diagram of a receiver in accordance with an exemplary embodiment of the invention.

FIG. 2 shows a block diagram of receiver 105 in accordance with an exemplary embodiment of the invention. When instructed by processor 201 through Ethernet connection 153 (corresponding to message 251), receiver 105 modulates the signal on input RF port 171. In order to modulate the signal, power supply modulation hardware 201 changes the voltage levels of power supply 203. RF choke 205 isolates power supply 203 from the RF signal component that is processed by RF circuitry 206. The upstream receiver (not shown) should detect the modulated signal.

Receiver 105 also includes detect circuitry to detect a modulated signal from a downstream receiver (not shown). In order to detect a modulated signal through output RF port 173, detector 209 detects a DC voltage transition in the modulated signal and reports the occurrence to processor 201 through Ethernet connection 153 (corresponding to message 253). RF choke 207 provides RF isolation for detector 209 when RF cascade circuitry 208 provides the RF signal to the downstream receiver. Detector 209 may assume different forms, including a slope detector or an analog-to-digital converter (ADC).

Figure 3:
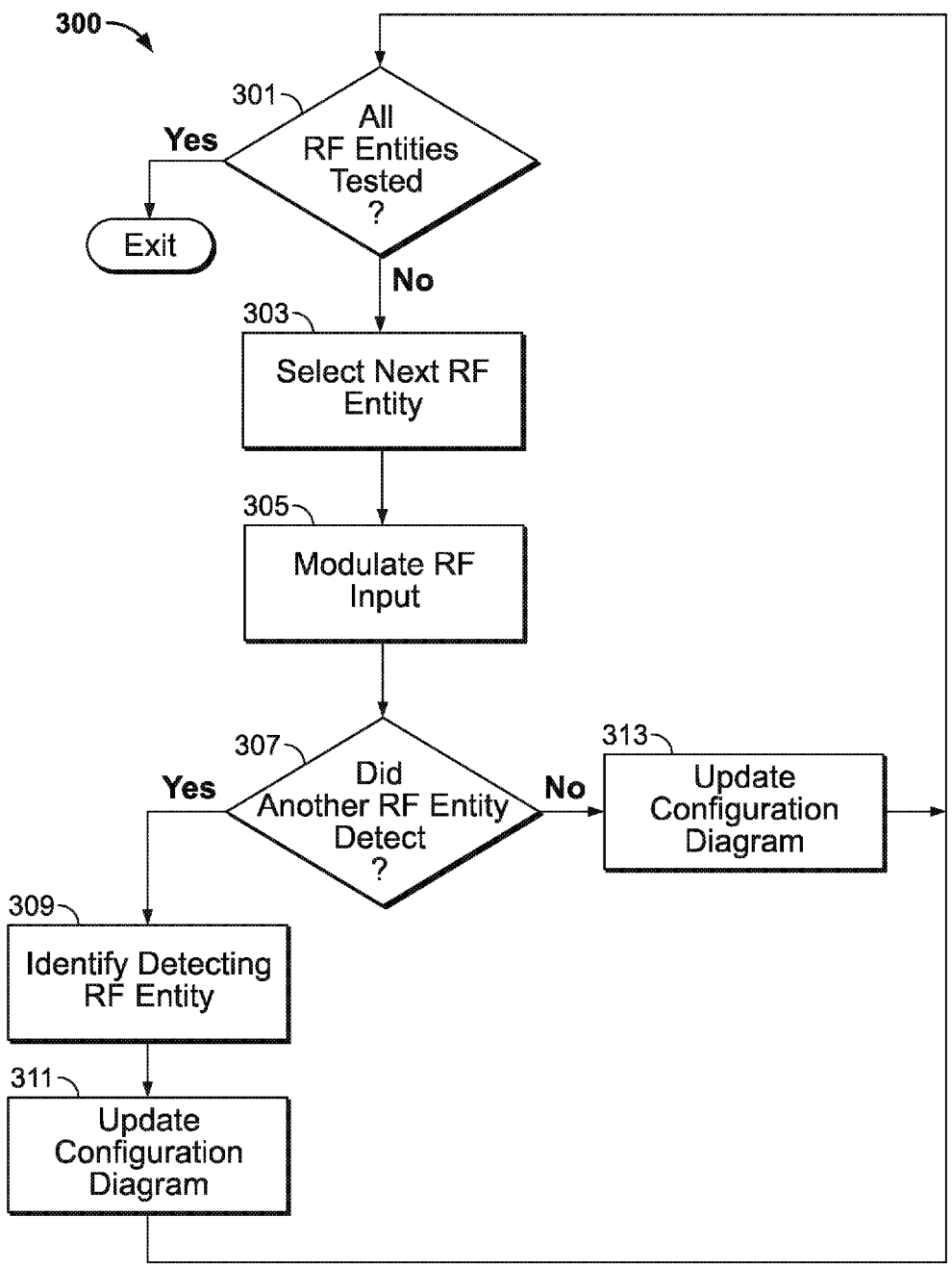
FIG. 3 shows a flow diagram for performing a self-discovery of an RF configuration for a wireless system in accordance with an exemplary embodiment of the invention.

FIG. 3 shows flow diagram 300 for performing a self-discovery of an RF configuration for RF distribution system 100 in accordance with an exemplary embodiment of the invention. In block 301, process 300 determines whether all of the RF entities (e.g., receivers, distribution amplifies, and scanners) have been tested. If not, the next RF entity is determined in block 303. With some embodiments, the next RF entity is determined from the assigned media access control (MAC) address. The next RF entity may be selected by different criteria, e.g., by selecting the MAC randomly or by selecting the MAC address in a predetermined order. With some embodiments, random selection of the MAC address may be approximated by a pseudo-random process.

As described above, the use of MAC addressing serves as a device identifier. However, other embodiments may use other forms of device-specific identifiers. For example, some embodiments may support a different protocol (e.g., USB or Zigbee) other than Ethernet.

In block 305, processor 101 instructs the selected RF entity to modulate the signal at its input RF port. In blocks 307, 309, and 311, the upstream RF entity should detect and report the modulated signal except when the instructed RF entity is a distribution amplifier (e.g., distribution amplifier 103 as shown in FIG. 1) that is connected to an antenna (e.g., antenna 102). Otherwise, a configuration error indication may be generated by processor 101 if none of the RF entities (components) detects the modulated signal.

The results of process 300 may be used in conjunction with further processing in which a diagram of RF distribution system 100 may be displayed on display device 115 (as shown in FIG. 1). The diagram may include hardware connections between RF entities and may also indicate whether there is an error in the RF configuration (e.g., when two receivers for different bands are connected or when a receiver is not connected to a distribution amplifier or another receiver). The analysis facilitates confirmation of correct system connections and may detect broken RF cables.

Figure 4:
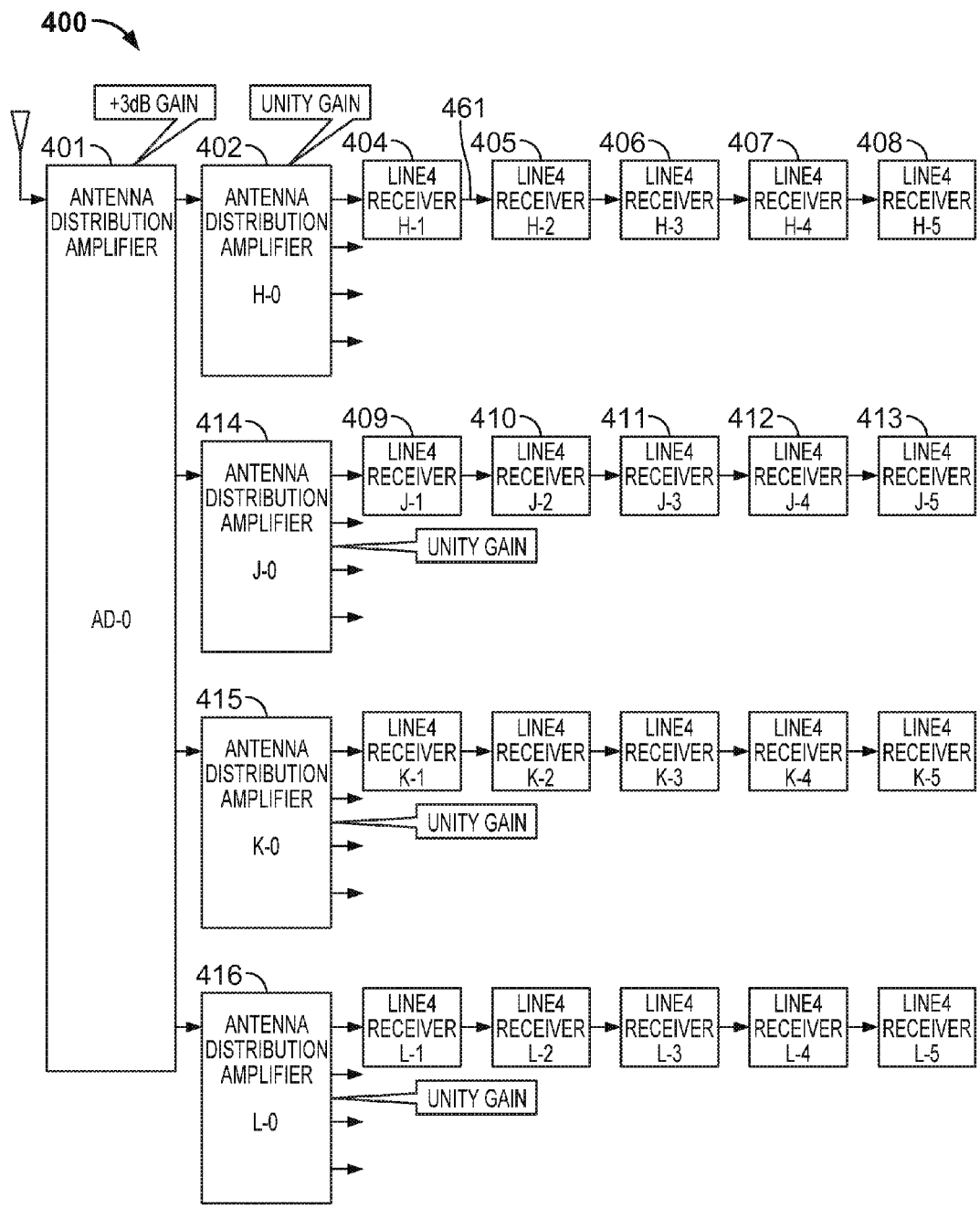
FIG. 4 shows an RF configuration for an RF distribution system in accordance with an exemplary embodiment of the invention.
Figure 5:
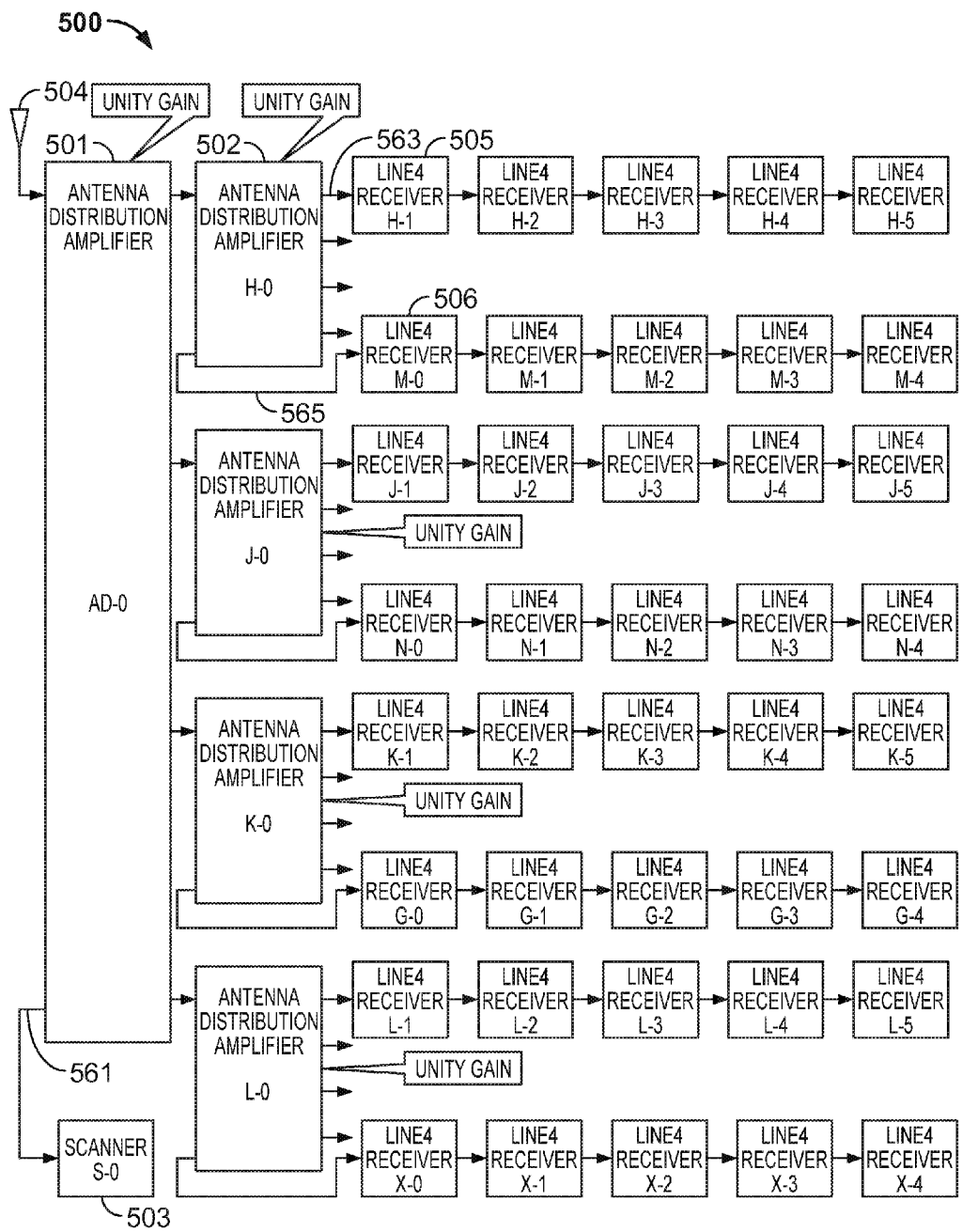
FIG. 5 shows an RF configuration for a wireless system in accordance with an exemplary embodiment of the invention.
Figure 6:
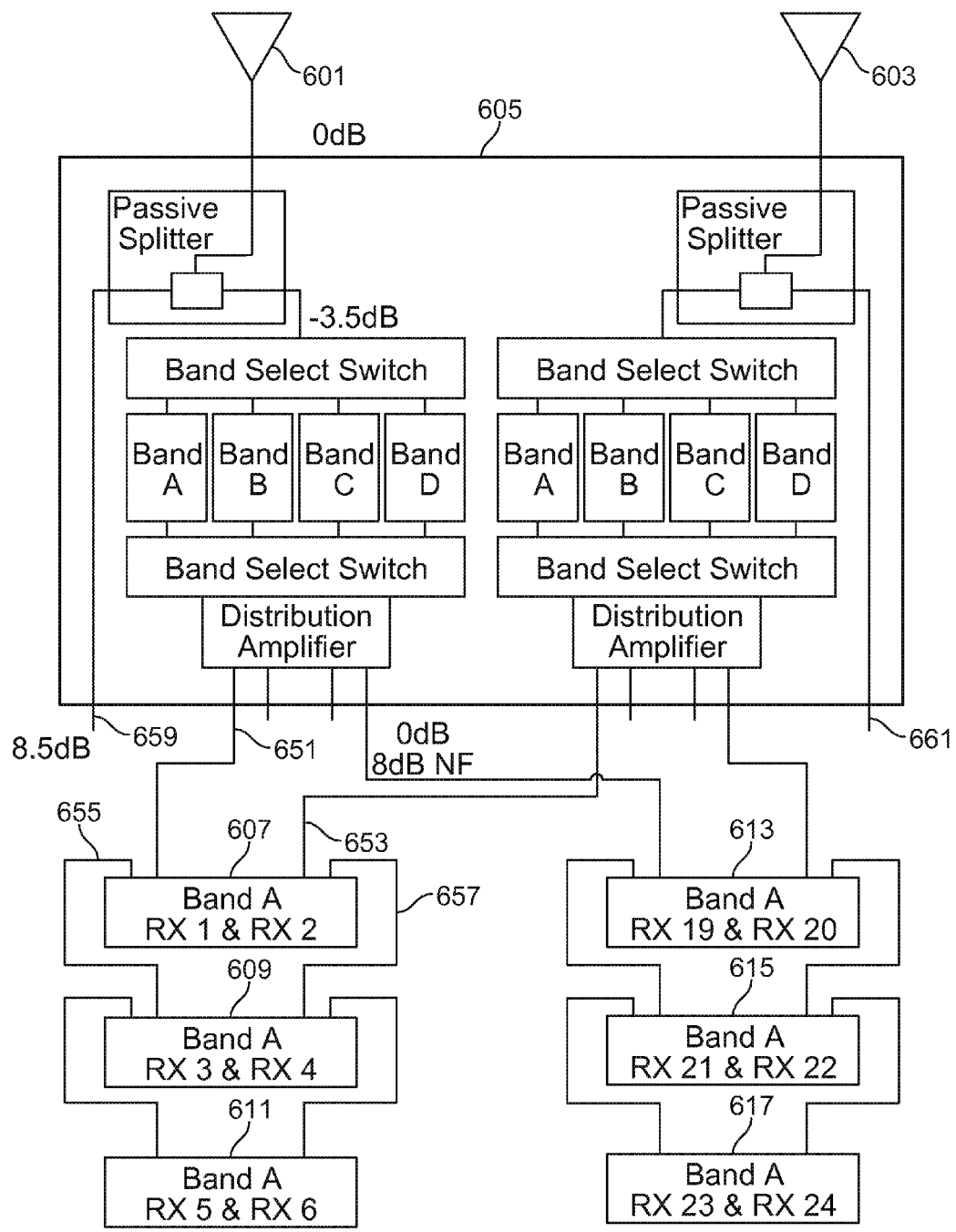
FIG. 6 shows a block diagram of a distribution amplifier that is connected to wireless receivers in accordance with an exemplary embodiment of the invention.

FIG. 4 shows RF configuration 400 for a wireless system in accordance with an exemplary embodiment of the invention. With an exemplary embodiment, bands H, J, K, and L correspond to 470 to 518 MHz, 518 to 578 MHz, 578 to 638 MHz, and 638 to 698 MHz, respectively. The outputs of a distribution amplifier may be set to one of the 4 bands or to wideband operation, i.e., the output spans the entire range from 470 to 698 MHz. Referring to FIG. 6, filter bands A, B, C and D as shown for distribution amplifier 605 correspond to filter bands H, J, K and L as shown in FIG. 4. Distribution amplifier 401 is configured to pass the entire filtered band (470-698 MHz). Distribution amplifiers 402, 414, 415, and 416 (H-0, J-0, K-0, and L-0, respectively) are set to sub-bands of 470-698 MHz as described above. Each wireless microphone receiver (e.g., receivers 404-413), antenna distribution amplifier (e.g., amplifiers 401 and 402), and scanner (scanner 503 as shown in FIG. 5) has a 12-15 VDC signal component present at the antenna input port. The DC voltage is typically used to drive line amplifiers and power antennas. With some embodiments, RF loop through (cascade) ports may not have a DC voltage source available. The DC voltage at the antenna ports may be toggled off and on (to modulate its operating voltage) during system setup via network command. If receivers are cascaded, the DC voltage from a receiver's antenna port is presented to the loop through port of the preceding receiver. The RF loop through port may sense the presence and modulation of the DC and thus may be indicative of the RF connection chain configuration.

For example, if the DC on the input antenna port of receiver (H-2) 405 is toggled off and on, the modulated signal should be sensed by the loop through port of receiver (H-1) 404 and reported to the network. The reported indication informs processor 101 that receivers share 405 and 404 RF connection 461 and should be set to operate within the same filter band. In a similar manner, each receiver and distribution amplifier in the network has its ports toggled one at a time. If a change in DC level is not sensed by another RF entity, the entity being toggled is assumed to be at the antenna end of the chain (corresponding to distribution amplifier 401). In the case of diversity systems, when a change is sensed only by one antenna port, a broken or missing RF cable may be detected.

A message may be reported via the computer network indicating the configuration of the RF connections and issuing warnings about broken RF cables. Receivers that are chained together should be set to the same frequency band because the RF signals of the receivers have been filtered to that band by the first receiver in the chain. If a distribution amplifier is band-selected, each receiver serviced by that distribution amplifier should be set to frequencies within the selected band. A distribution amplifier (e.g., amplifier 401 as shown in FIG. 4) may also be set to wideband operation (simultaneously passing all signals within bands A, B, C, and D as shown with distribution amplifier 605 in FIG. 6). Each cascaded distribution amplifier (e.g., amplifier 402) may be separately band selected and support four receiver chains, where each chain is associated with the same frequency band.

The loop-through of an antenna distribution amplifier may also be set to wideband operation in order to support a wideband scanner (not explicitly shown in FIG. 4 but as discussed with FIG. 5).

With some embodiments, distribution amplifiers (e.g., amplifiers 401 and 402) may be cascaded to increase the number of receivers that can be supported by RF distribution system 100. With some embodiments, the gain of the second distribution amplifier (e.g., amplifier 402) is typically set to unity.

FIG. 5 shows RF configuration 500 for a wireless system in accordance with an exemplary embodiment of the invention. Configuration utilizes scanner 503 that scans the frequency spectrum of the input signal from antenna 504 through distribution amplifier 501 and RF connection 561. Distribution amplifier 501 provides both filtered outputs (e.g., corresponding to output 651 as shown in FIG. 6) as well as an unfiltered output (e.g., corresponding to output 659). Scanner 503 analyzes the unfiltered output through connection 561 and reports the results to processor 101 (as shown in FIG. 1) as previously discussed.

Distribution amplifier 501 is cascaded to distribution amplifier 502, which provides filtered signals (e.g., to receiver 505 through connection 563) and unfiltered signals (e.g., receiver 506 through connection 565).

FIG. 6 shows a block diagram of distribution amplifier 605 that is connected to receiver units 607, 609, 611, 613, 615, and 617 in accordance with an exemplary embodiment of the invention. Distribution amplifier 605 receives signals through antennas 601 and 603 and provides filtered RF outputs to each receiver in order to support diversity reception. For example receiver unit 607 (comprising receivers 1 and 2) is provided two RF input signals through RF connections 651 and 653. With some embodiments, receivers 1 and 2 are internally cascaded within receiver unit 607 and set to the same frequency band. With other embodiments, receivers 1 and 2 may be externally cascaded through a coaxial cable. Receiver unit 609 is cascaded to receiver unit 607 through RF connections 655 and 657. Receiver unit 611 is further cascaded from receiver unit 609.

As previously discussed, distribution amplifier 605 also provides unfiltered RF signals through connections 659 and 661 in order to support additional receivers or a scanner.

Figure 7:
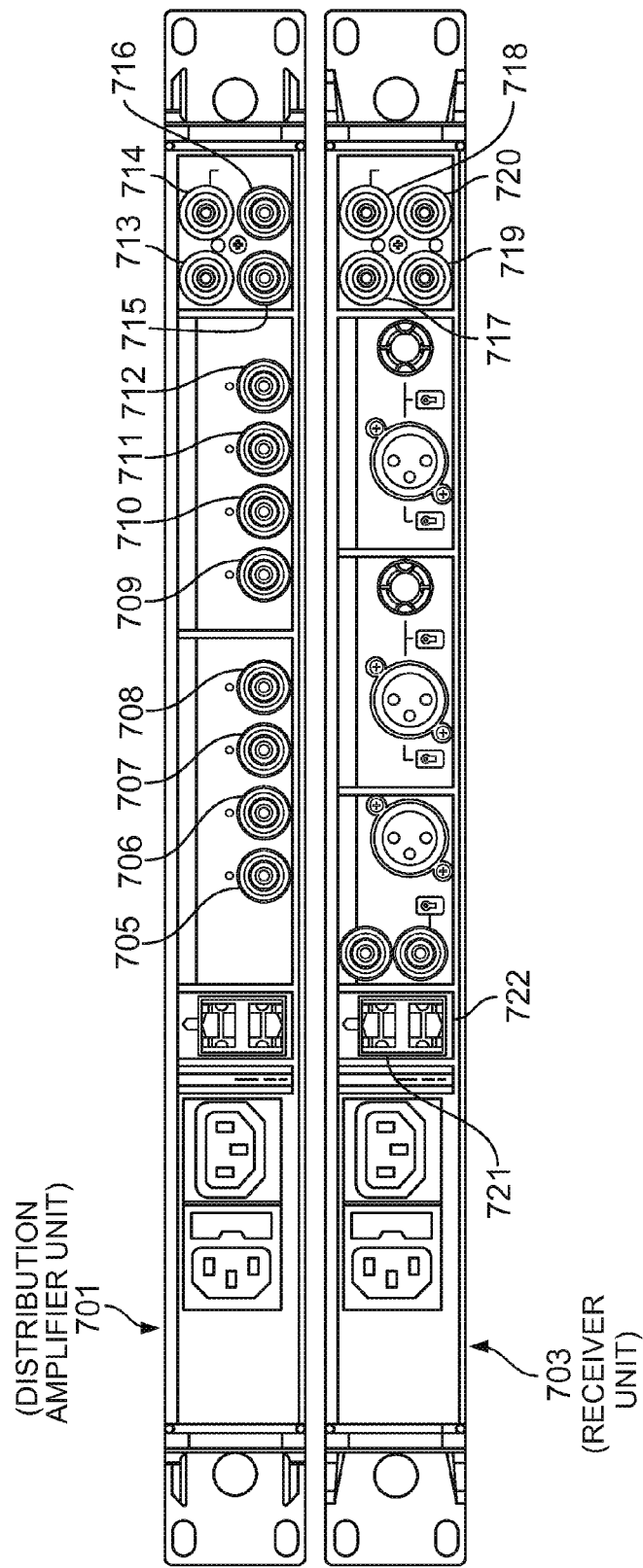
FIG. 7 shows back panels of a distribution amplifier unit and receiver unit in accordance with an exemplary embodiment of the invention.

FIG. 7 shows back panels 701 and 703 for distribution amplifier unit 605 and receiver unit 607, respectively in accordance with an exemplary embodiment of the invention. While FIG. 7 shows only one distribution amplifier unit and one receiver unit, a plurality of distribution amplifier units and receivers may be configured into system 100, in which the units may be stacked in one or more racks. For example, some exemplary configurations may support over 100 channels and thus over 50 dual channel receiver units.

Two antennas may be connected to BNC connectors 713 and 714 of back panel 701 in order to provide RF diversity. Both filtered RF outputs (supporting diversity pairs and corresponding to BNC connectors 705 and 709, 706 and 710, 707 and 711, and 708 and 712) and unfiltered RF outputs (corresponding to BNC connectors 715 and 716) may be connected to receiver units through coaxial cables.

Back panel 703 corresponds to two receivers (channels), where Ethernet connectivity is established by daisy chaining through connectors 721 and 722. Diversity input RF signals are provided through BNC connectors 717 and 718 and are cascaded to another receiver unit through BNC connectors 719 and 720.

The following are exemplary embodiments.

A method (e.g., RF distribution system) comprising in combination one or more of the followings aspects:
  instructing a first RF component (e.g., a first wireless receiver) to modulate signal on a first port of the first RF component
    modulating a signal by changing DC voltage (e.g., ON/OFF or between an operational voltage level and an intermediate voltage level) on an RF input port
    modulating a signal with a tone
    serial data (simplex or duplex)
  receiving an indication from a second RF component (e.g. a second wireless receiver) that a modulated signal is detected on a second port of the second RF component
    detecting a modulated signal on a cascaded RF output port of the second RF component
  repeating the instructing for remaining RF components system so that the RF configuration is determined
    determining the next RF component based on a MAC address
  verifying the determined system configuration for operational consistency
    verifying the consistency of the bands for connected RF components
    verifying that a component is connected to another component An apparatus (e.g., RF distribution system) comprising in combination one or more of the followings aspects:

a processor (and optionally a memory and communications interface) configured to cause the apparatus to
   instruct a first RF component (e.g., a first wireless receiver) to modulate signal on a first port of the first RF component
      modulate a signal by changing DC voltage (e.g., ON/OFF or between an operational voltage level and an intermediate voltage level) on RF input port
      modulate a signal with a tone
      serial data (simplex or duplex)
   receive an indication from a second RF component (e.g. a second wireless receiver) that a modulated signal is detected on a second port of the second RF component
      detect a modulated signal on a cascaded RF output port of the second RF component
   repeat the instructing for remaining RF components so that the system configuration is determined
      determine the next RF component based on a MAC address
   verify the determined system configuration for operational consistency
      verify the consistency of the bands for connected RF components
      verify that a component is connected to another component A computer-readable medium that contains computer readable instructions that cause an apparatus (e.g., RF distribution system) to perform in combination one or more of the followings aspects comprising:
   instructing a first RF component (e.g., a first wireless receiver) to modulate signal on a first port of the first RF component
      modulating a signal by changing DC voltage (e.g., ON/OFF or between an operational voltage level and an intermediate voltage level) on RF input port
      modulating a signal with a tone
      serial data (simplex or duplex)
   receiving an indication from a second RF component (e.g., a second wireless receiver) that a modulated signal is detected on a second port of the second RF component
      detecting modulated signal on a cascaded RF output port of the second RF component
   repeating the instructing for remaining RF components so that the system configuration is determined
      determining the next RF component based on a MAC address
   verify the determined system configuration for operational consistency
      verify consistency of the bands for connected RF components
      verify that a component is connected to another component With some embodiments, data may be transported between entities of a communication system over pathways that are also used for other purposes, e.g., the distribution of radio frequency (RF) signals or providing direct current (DC) electrical power. Consequently, the need for separate data connections, e.g., Ethernet connection 153 as shown in FIG. 1, may be circumvented. FIGS. 8-23 show some embodiments that exemplify this approach.

As will be discussed with FIGS. 16-18, entities of the communication system may send data (e.g., containing messages) to other entities over the pathways in order to configure the communication system. For example, a receiver in an RF distribution system can scan an RF spectrum and send the results to other receivers so that each of the receivers can configure its operating frequency from a set of frequencies for the best RF compatibility.

Figure 8:
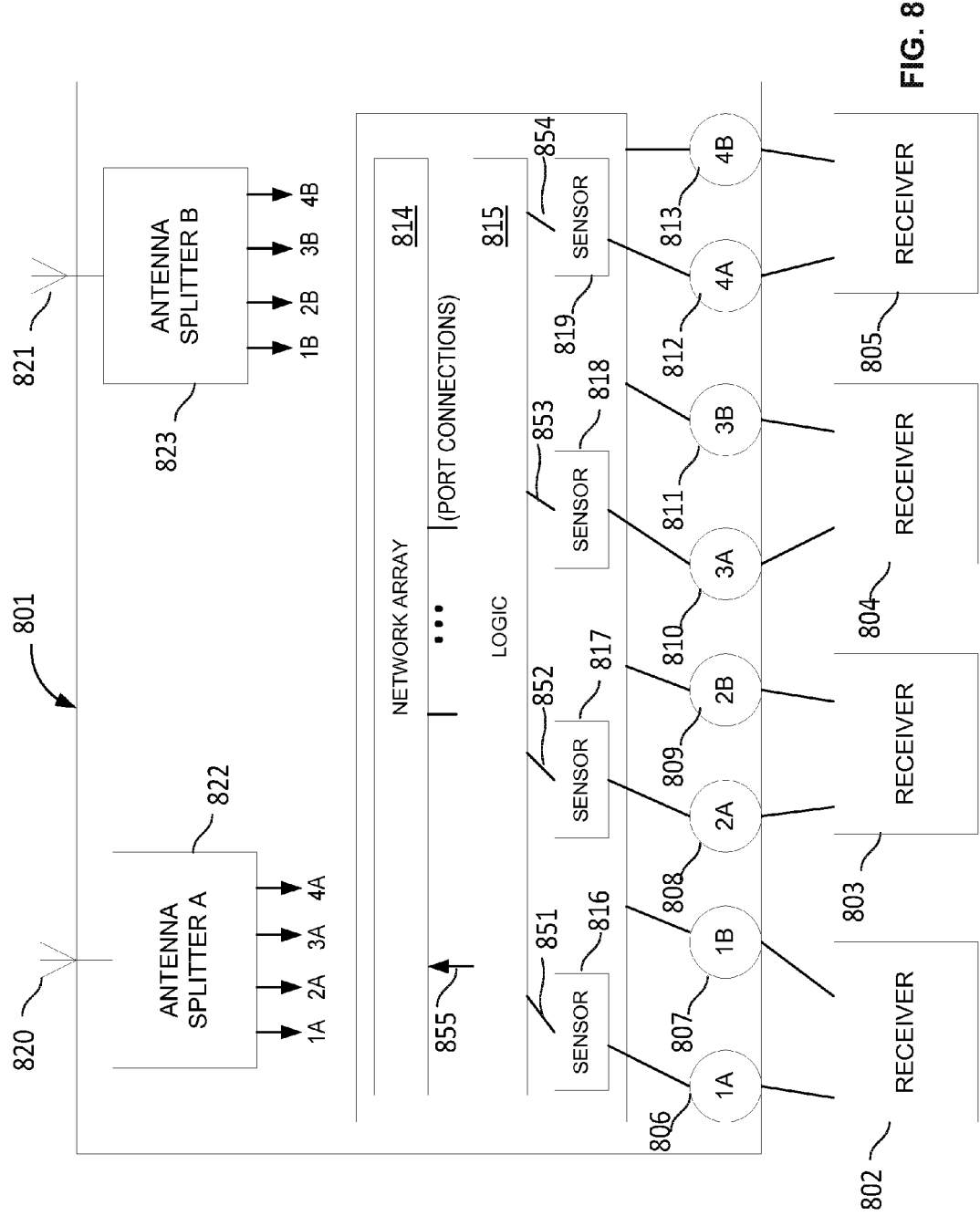
FIG. 8 shows a wireless communication system in accordance with an aspect of the embodiments.

FIG. 8 shows a wireless communication system in accordance with an aspect of the embodiments. The communication system comprises distribution system 801 and receivers 802-805 that may support a plurality of wireless microphones for an entertainment venue. In addition, some embodiments of the disclosure may support a communication system for wireless telephony, including base stations that interact with wireless portable devices.

For traditional systems, the setup process for the wireless microphones typically requires either a manual procedure or traditional networking protocols (i.e. Ethernet and so forth) according to an aspect of the disclosure, RF connections are utilized in a distribution system 801 to provide networking functionality. A feature-set of an embodiment includes automatic deployment of optimal configuration after conducting a scan of RF spectrum. Other configuration settings may also be deployed, such as locking of controls. Furthermore, according to an aspect of the disclosure, no additional connections are required beyond that required by distribution system 801.

Each receiver 802-805 is configured to operate at a desired frequency for an RF signal received through antennas 820 and 821 via antenna splitters 822 and 823, respectively. Distribution system 801 provides diversity reception using antennas 820 and 821 (each antenna corresponding to a diversity branch) that typically provides for more robust reception than with a single antenna.

Each receiver 802-805 obtains an RF signal from antenna 820 via A-ports 806, 808, 810, and 812, respectively, and from antenna 821 via B-ports 807, 809, 811, and 813, respectively.

Figure 12:
FIG. 12 shows a mapping of network paths to sensed receiver configurations for a wireless communication system in accordance with an aspect of the embodiments.

According to an aspect of the disclosure, in addition to distribution of the RF signals, data may be transported among receivers 802-805 and distribution system 801 through A ports 806, 808, 810, and 812 and B-ports 807, 809, 811, and 813 via network array 814 as controlled by logic module 815. Data may be routed through network array 814 by detecting the configured receivers connected to distribution system 801 based on detection indications 851-854 from sensors 816-819, respectively. Logic module 815 may then process the detection indications 851-854 to obtain routing control signal 855 to control the routing of data among receivers 802-805. An example of the control of routing is shown in FIG. 12, which maps sensed receivers 1201 to network paths 1202, as will be discussed in further detail.

With an embodiment of the disclosure, network array 814 and logic module 815 may include a processor such as a microcontroller unit (MCU) and/or discrete logic devices such as an array of multiplexers and transistors. Logic module 815 sends control signal 855 to network array 814.

With an aspect of the disclosure, data is routed through coaxial antenna ports (corresponding to ports 806-813) based on the system configuration. Processing may be performed in distribution system 801 and processed data may then be sent to receivers 802-805. Also, processing may occur at one of the receivers 802-805 and then routed through distribution system 801 to all other receivers 802-805.

According to an aspect of the disclosure, a data signal is included with an RF signal through ports 806-813 by data modulation in accordance with approaches previously discussed (e.g., modulating a DC component or a tone).

According to an aspect of the disclosure, data is routed from each A-port to the appropriate B-port, but the routing may be dynamically adjusted to compensate for connection configurations without user intervention if the receiver configuration changes.

While the embodiment shown in FIG. 8 shows four receivers 802-805 connected to distribution system 801, embodiments may support a different number of receivers that is different from four. In addition, as will be discussed in further detail, the number of supported receivers may be expanded by connecting a plurality of distribution systems together.

Also, while the embodiment shown in FIG. 8 shows configured receivers 802-805 that are connected to distribution system 801, embodiments of the disclosure may support other types of entities. For example, a communication system may combine RF signals from transmitters though RF ports and may use these RF ports for data connectivity among the connected transmitters.

Figure 9:
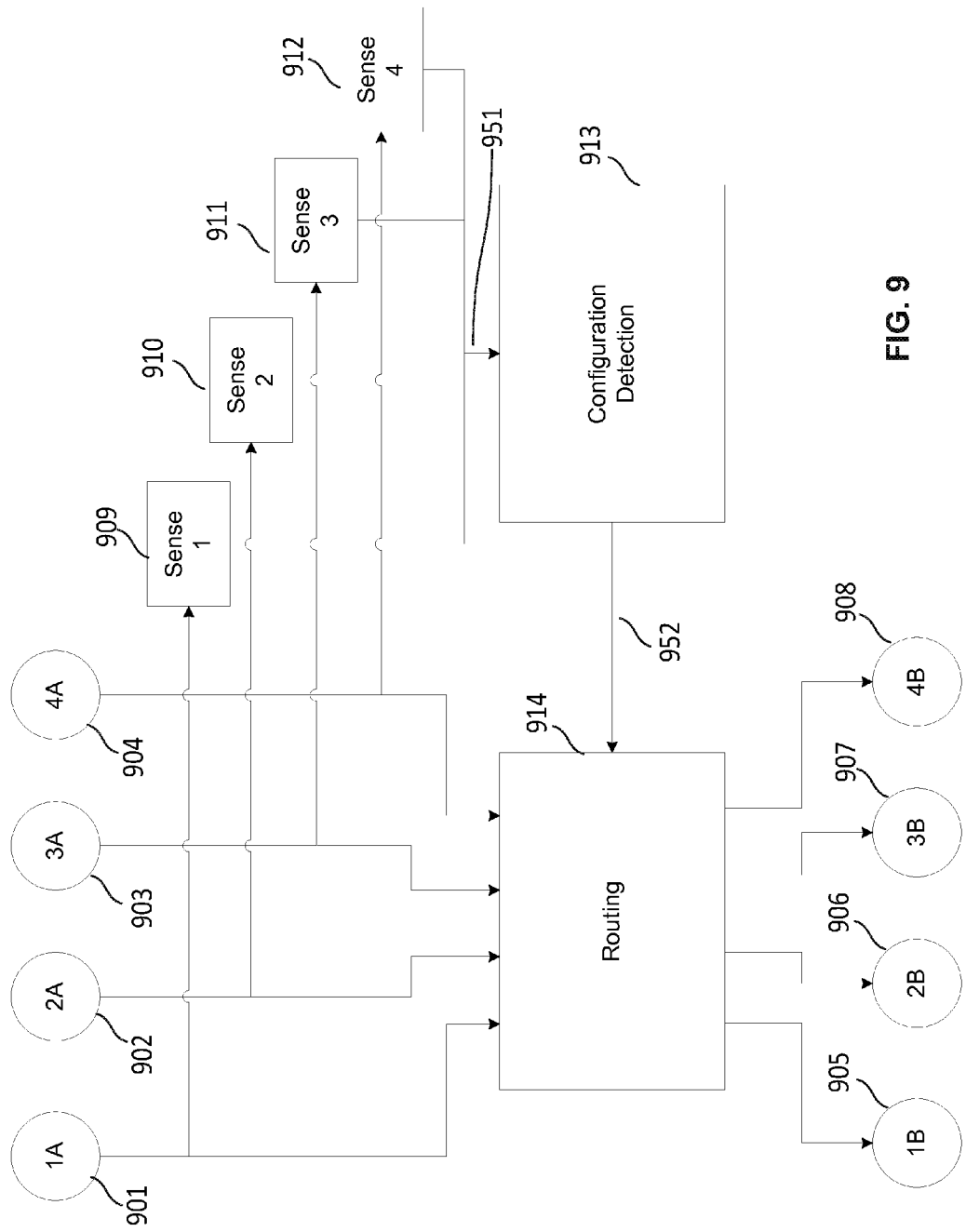
FIG. 9 shows a block diagram for routing between ports based on sensing configured receivers in accordance with an aspect of the embodiments.

FIG. 9 shows a block diagram for routing between ports based on sensing configured receivers in accordance with an aspect of the embodiments. Data transmission between receivers 802-805 (as shown in FIG. 8) may be sent from A-ports 901-904 to corresponding B-ports 905-908 through routing module 914 based on control signal 952 from configuration detection module 913.

With some embodiments of the disclosure, sense modules 909-912 determine whether a receiver is connected to the corresponding A-port by determining whether there is a data signal superimposed on an RF signal. For example, when a receiver is in a data standby state, a logic high level is present on its A-port. This signal is detected by the sensing module 909-912, which provides indication signal 951 to configuration detection module 913 to generate control signal 952. Routing module 914 configures a path from A-ports 901-904 to corresponding B-ports 905-908 (as exemplified in FIG. 12) in accordance with control signal 952.

Figure 10:
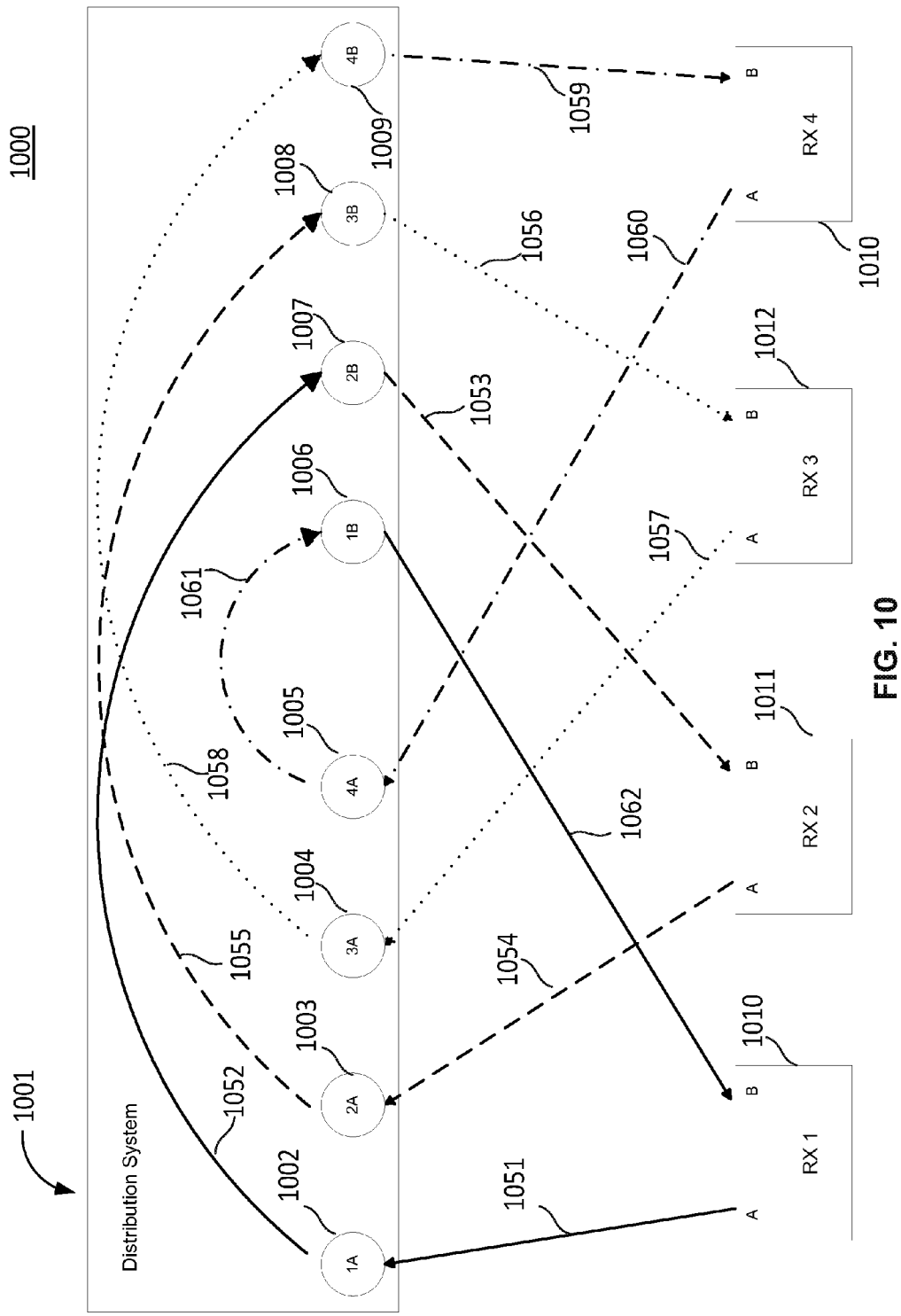
FIG. 10 shows an exemplary routing configuration of a wireless communication system in accordance with an aspect of the embodiments.

FIG. 10 shows exemplary routing configuration 1000 of a wireless communication system in accordance with an aspect of the embodiments. Receivers 1010, 1011, 1012, and 1013 are connected to distribution system 1001 via A-ports 1002-1005 and B-ports 1006-1009 with RF cables 1051, 1053, 1054, 1056, 1057, 1059, 1060, and 1062 (typically BNC, SMA, and the like). Paths 1052, 1055, 1058, and 1061 may be established through a network (e.g., network array 814 as shown in FIG. 8 or routing module 914 as shown in FIG. 9) within distribution system 1001.

Data transmission from receiver 1010 with the other receivers 1011-1013 are established through: 1051→1052→1053→1054→1055→1056→1057→1058→1059→1060→1061→1062. This path corresponds to RX1→RX2→RX3→RX4→RX1 as shown with the entry FIG. 12, where the detected receiver indication equals "1111." With this example, receiver 1010 may function as a master device, in which command data (e.g., lock, unlock, and scan as discussed with FIGS. 16-17) may originate and be passed to the other receivers 1011-1013. The master device may be designated such that network communication is initiated from only a single device rather than any device in the system. This approach may be desirable from a user interface perspective and may minimize cost or complexity in design. However, some embodiments of the disclosure may have any receiver device in the system function as the master device.

Figure 11:
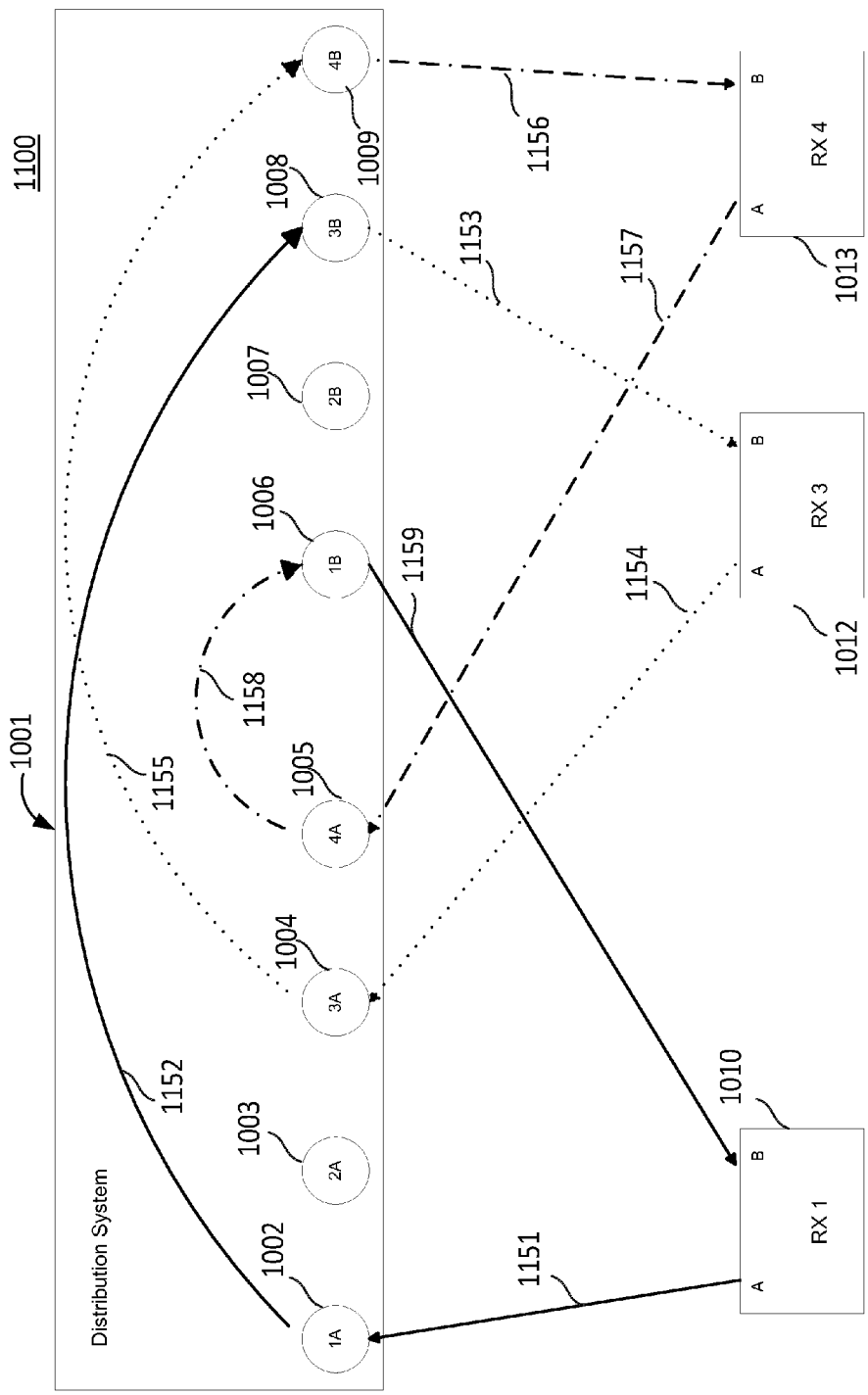
FIG. 11 shows an exemplary re-routing of a routing configuration for a wireless communication system in accordance with an aspect of the embodiments.

FIG. 11 shows an exemplary re-routing of a routing configuration 1100 of a wireless communication system in accordance with an aspect of the embodiments. Receivers 1010, 1012, and 1013 (i.e., receiver 1011 is not configured) are connected to distribution system 1001 via A-ports 1002, 1004, and 1005 and B-ports 1006, 1008, and 1009 with RF cables 1151, 1153, 1154, 1156, 1157, and 1159. Paths 1152, 1155, and 1158 may be established through a network (e.g., network array 814 as shown in FIG. 8 or routing module 914 as shown in FIG. 9) within distribution system 1001.

Data transmission from receiver 1010 with the other receivers 1012-1013 are established through path: 1151→1152→1153→1154→1155→1156→1157→1158→1159. This path corresponds to RX1→RX3→RX4→RX1 as shown with the entry FIG. 12, where the detected receiver indication equals "1011." FIG. 12 includes all possibilities for configuring receivers 1010-1013 with distribution system 1001.

According to an aspect of the disclosure, the receiver configuration may be static (where the receiver configuration does not change after initial setup) or may be dynamic (where the receiver configuration changes after the initial setup). With dynamic configuration, logic module 815 (as shown in FIG. 8) continuously monitors sensors 816-819 and correspondingly modifies control signal 855.

Figure 13:
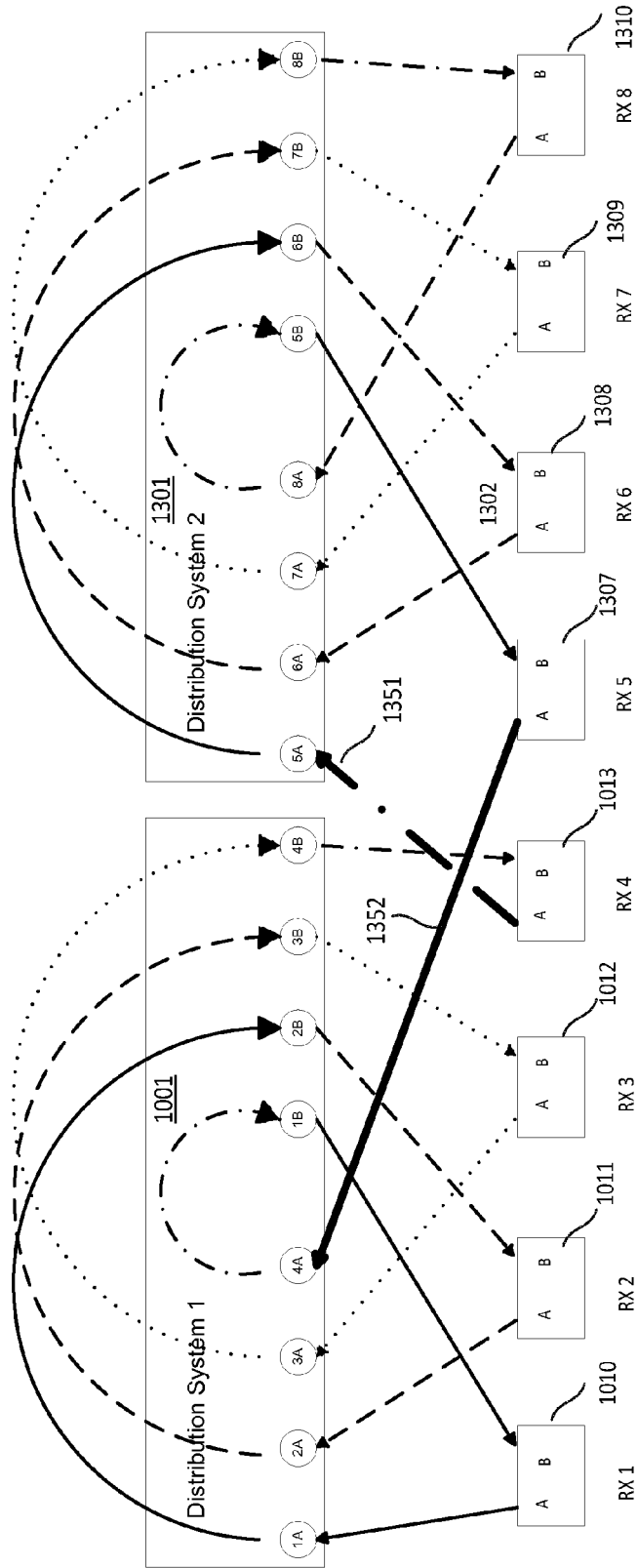
FIG. 13 shows an example of extending a wireless communication system in accordance with an aspect of the embodiments.

FIG. 13 shows an example of extending a wireless communication system in accordance with an aspect of the embodiments. For system expansion beyond the number of receivers compatible with a single distribution system, multiple distribution systems can be daisy-chained together. Daisy-chaining may be accomplished using an inherent design, in which case a set of cables is swapped between each system. Referring to FIG. 13, additional receivers 1307-1310 are accommodated by adding distribution system 1301 and connecting RF cable 1351 from receiver 1013 to distribution system 1301 and RF cable 1352 from receiver 1307 to distribution system 1001.

Figure 14:
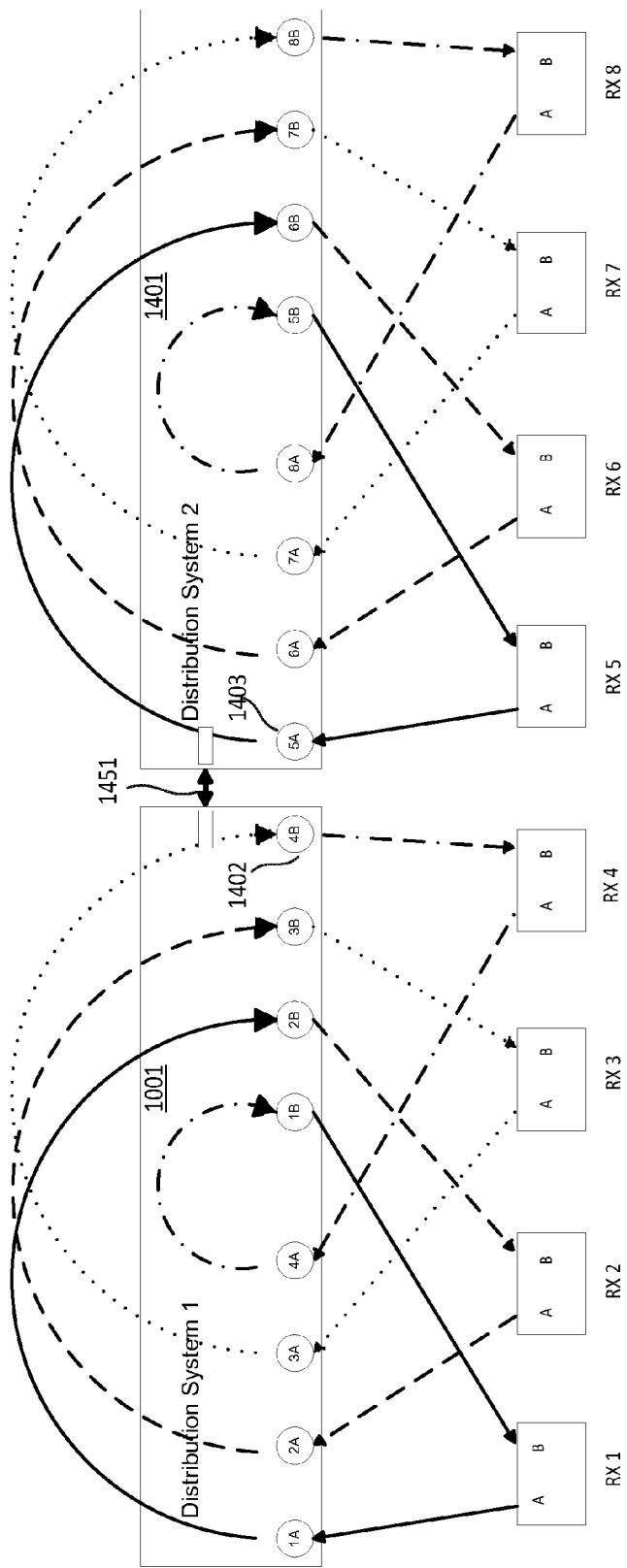
FIG. 14 shows an example of extending a wireless communication system in accordance with an aspect of the embodiments.

FIG. 14 shows an example of extending a wireless communication system in accordance with an aspect of the embodiments. A separate daisy-chain link 1451 connects distribution system 1401 to distribution system 1001. Link 1451 provides bi-directional data connectivity to extend the appropriate A-port of distribution system 1001 to the appropriate B-port of distribution system 1401 and the appropriate A-port of distribution system 1402 to the appropriate B-port of distribution system 1001. Routing to and from link 1451 is dynamically assigned based on the configuration of receivers, in a similar manner as was previously discussed.

Figure 15:
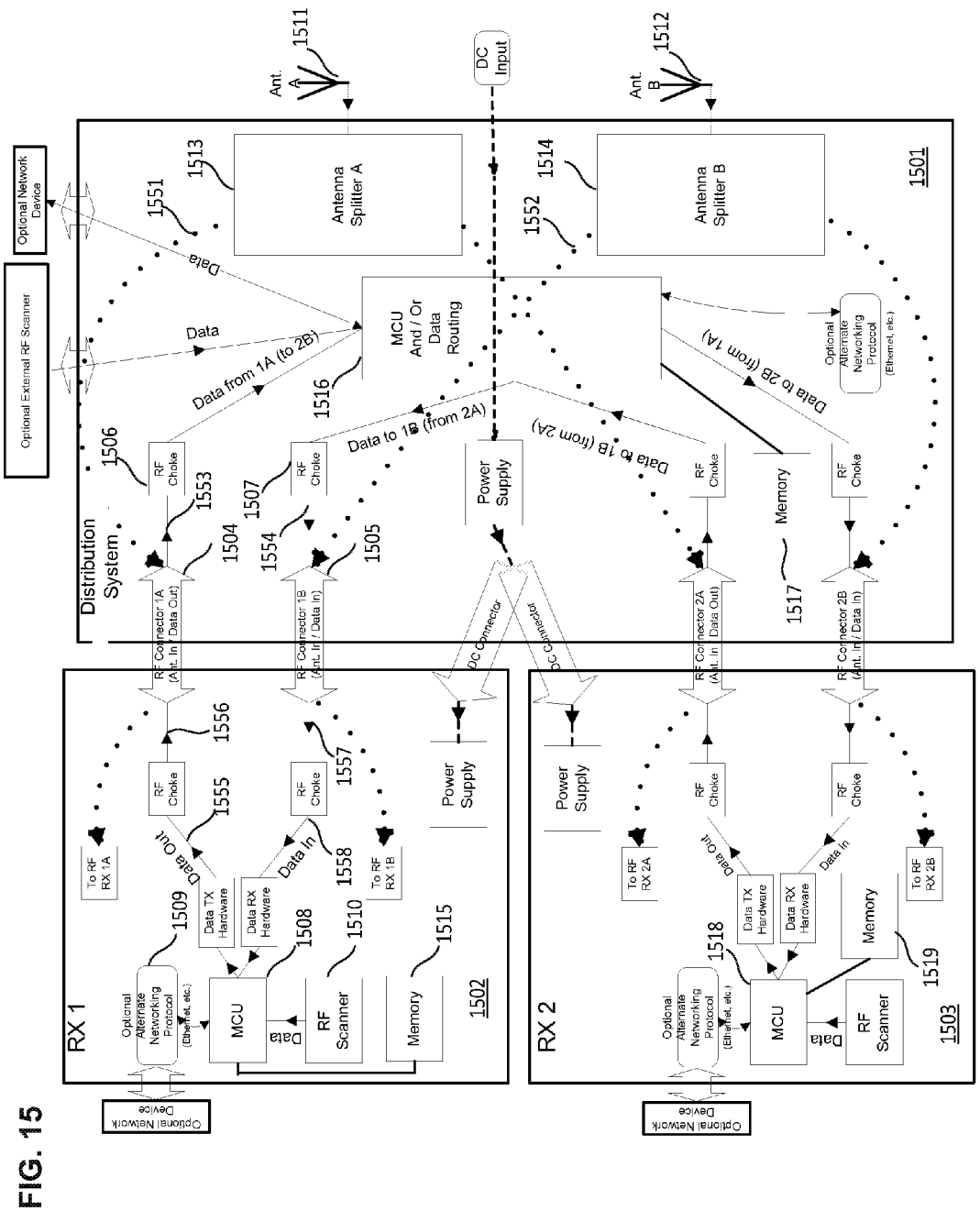
FIG. 15 shows a wireless communication system in accordance with an aspect of the embodiments.

FIG. 15 shows a wireless communication system in accordance with an aspect of the embodiments. Receivers 1502 and 1503 are connected to distribution system 1501 through A-ports and B-ports in a similar manner as with FIG. 8. For example, receiver 1502 is connected to distribution system 1501 through A-port 1504 and B-port 1505. RF connectivity from antenna 1511 (corresponding to the first diversity branch for receiver 1502) to A-port 1504 is supported through antenna splitter 1513 and path 1551. Similarly, RF connectivity from antenna 1512 (corresponding to the second diversity branch for receiver 1502) to B-port 1505 is supported through antenna splitter 1514 and path 1552.

At distribution system 1501, data connectivity from A-port 1504 to processor 1516 is supported through RF choke 1506 (which blocks RF connectivity) and path 1553, and data connectivity to B-port 1505 is supported through RF choke 1507 and path 1554. Data connectivity at receiver 1502 to the A-port is provided from processor 1508 through paths 1555 and 1556 and to the B-port to processor 1508 through paths 1557 and 1558.

With an aspect of the disclosure, protocol module (e.g., module 1509) may support alternative networking protocols (Ethernet, WiFi, Zigbee, Bluetooth, and so forth) that may be added to receivers 1502 and 1503 and/or distribution system 1501. This additional functionality may override or work in conjunction with data connectivity provided through the A-ports and B-ports as discussed herein.

Receivers 1502 and 1503 may also include a scanner (e.g., scanner 1510) in order to scan an RF spectrum for determining the set of frequencies that provide the best RF compatibility. The scanning capability may be used to support a scanning process that will be further discussed with FIG. 17.

Processors 1508, 1516, and 1518 may execute computer executable instructions from a computer-readable medium, e.g., memories 1515, 1517, and 1519, respectively, in order to perform any or all of the processes described herein). Receivers 1502 and 1503 and distribution system 1501 may include one or more application-specific integrated circuits (ASICs), complex programmable logic devices (CPLDs), field-programmable gate arrays (FPGAs), or other integrated circuits. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processors 1508, 1516, and 1518. The executable instructions may carry out any or all of the method steps described herein.

Receivers 1502 and 1503 and distribution system 1501 or portions thereof may be implemented as one or more application-specific integrated circuits (ASICs), complex programmable logic devices (CPLDs), field-programmable gate arrays (FPGAs), or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Figure 16:
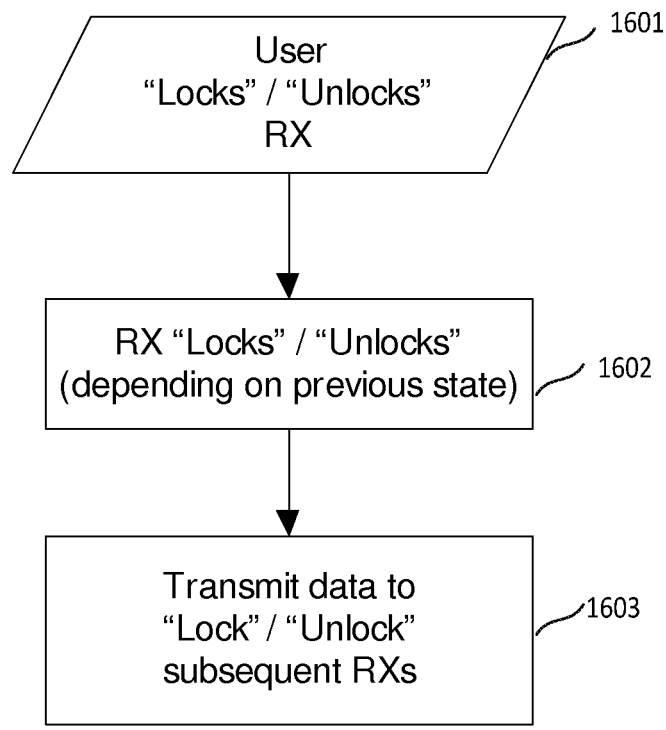
FIG. 16 shows a flow chart for locking a receiver in a wireless communication system in accordance with an aspect of the embodiments.
Figure 17:
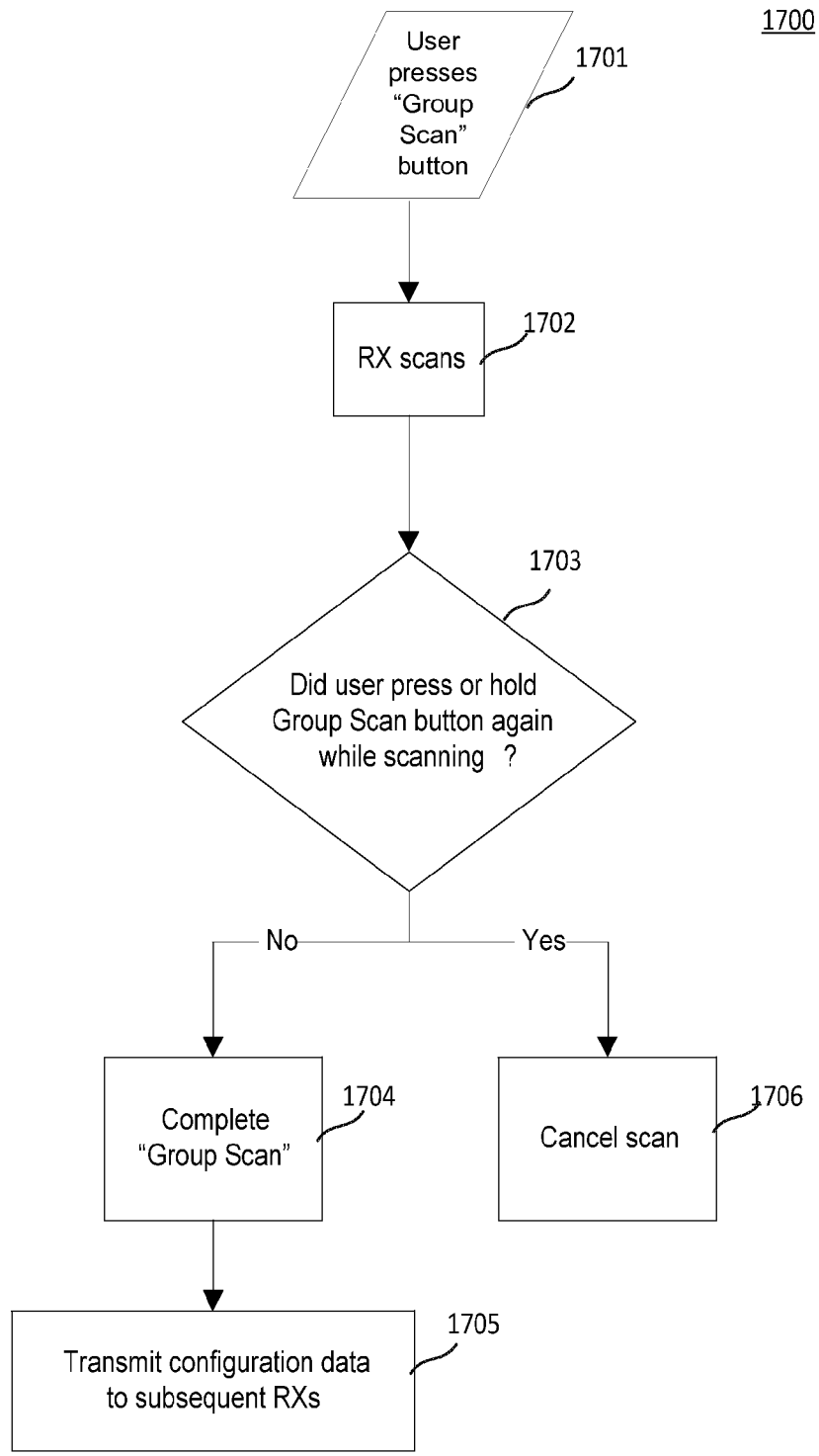
FIG. 17 shows a flow chart for a scanning process in a wireless communication system in accordance with an aspect of the embodiments.
Figure 18:
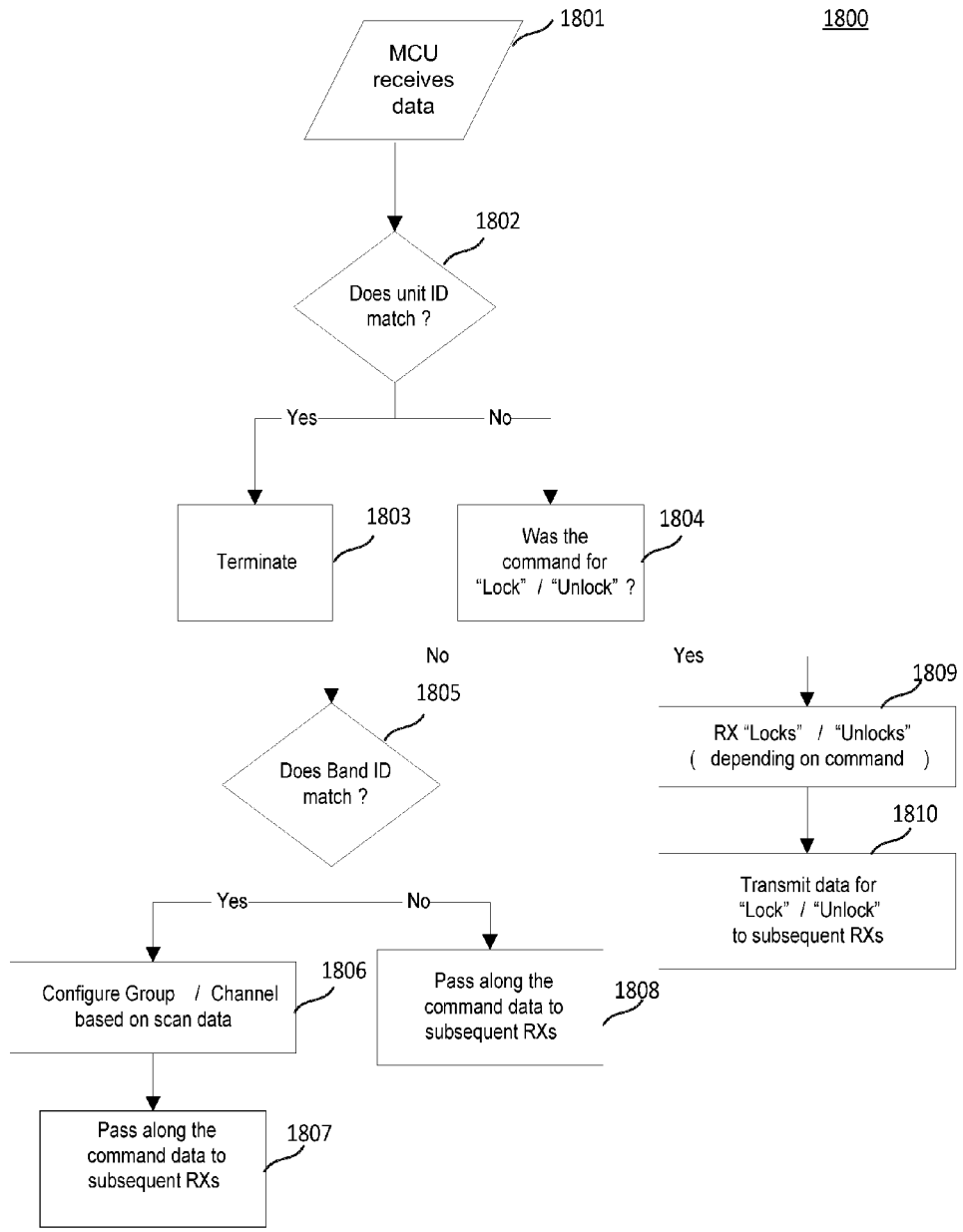
FIG. 18 shows a flow chart for sending data among receivers in a wireless communication system in accordance with an aspect of the embodiments.

FIGS. 16-18 show processes in which one or more of the configured receivers can send data (that may be formatted as control/command messages) to the other receivers. According to an aspect of the disclosure, one of the receivers is designated as the master receiver. In such a case, only the master receiver can originate a command message such as a lock/unlock message or can scan an RF spectrum in order to configure the channel settings of the receivers.

According to an aspect of the disclosure, routed data may be formatted into a command message that may include a command type, originating device identification, destination device identification, and command information. With some embodiments, the originating device identification and/or destination device identification may not be included. In such a case, all receivers receiving the message should execute the command.

FIG. 16 shows flow chart 1600 for locking/unlocking a receiver in a wireless communication system in accordance with an aspect of the embodiments. Settings (e.g., frequency, gain level, and squelch threshold at receivers 1502 and 1503 may be locked or unlocked in accordance with user input at one or more of the receivers. For example, a user may select locking or unlocking at one the configured receivers (e.g., receiver 802 as shown in FIG. 8). The receiver may send a lock or unlock message to the other receivers through the A-ports and B-ports of the connected distributed system to inform the other receivers about the locking or unlocking of the settings. Accessories (e.g., remote antennas) and/or supplemental user interface elements (e.g., front panel display, software program on networked device) may be utilized and/or controlled.

Referring to flow chart 1600, a user locks or unlocks a receiver, e.g., receiver 802 as shown in FIG. 8, at block 801 by providing a lock/unlock indicator. For example, the user may press a lock/unlock push button on a panel of the receiver that toggles between lock and unlock states. When the lock/unlock state changes at block 1602, the receiver generates a corresponding message that is sent to the other receivers at block 1603 through the A-ports and B-ports in a manner previously discussed. The other receivers can change their lock/unlock states in accordance with the message.

FIG. 17 shows flow chart 1700 for a scanning process in a wireless communication system in accordance with an aspect of the embodiments. At block 1701, a user initiates a group scan on any receiver in the system by, for example, pressing the scan push button on the receiver's panel. The receiver consequently scans the RF spectrum (e.g., with scanner 1510 as shown in FIG. 15) at block 1702 to determine the most open group frequency, and then to sort the frequency channels based on best availability. The scan may be canceled at block 1706 if the user presses scan push button again at block 1703.

If the scan is not canceled, the initiating receiver completes the scan at block 1704 and passes resulting configuration data to the other receivers at block 1705 so that the receivers can set to the same group and sequentially deploy channel assignments based on descending RF availability. In this way, the system is optimally configured for the best channels for operation. Optimization may be based on RF spectrum availability, so that higher detected RF noise or interference on a given channel results in lower deployment-prioritization for that channel.

Receivers may be aware of multi-band or multi-product networks and may act accordingly. For example, group/channel deployment may be skipped for a non-matching band/product, but a lock/unlock command may be accommodated across multiple bands/products.

FIG. 18 shows flow chart 1800 for sending data to receivers in a wireless communication system in accordance with an aspect of the embodiments. At block 1801, a receiver receives data and determines whether the data contains identification matching the receiver's identification at block 1802. If so, the data is processed so that passing of data to other receivers is terminated at block 1803.

However, if the identification does not match and the command is to lock/unlock at block 1804, the receiver executes the command and passes the command to the other receivers at blocks 1809 and 1810. Otherwise, if the scan configuration information matches the receiver's band identification at block 1805, the receiver configures its frequency setting according to the scan data at block 1806 and passes the data to the other receivers at block 1807. If the receiver's band identification does not match, the command data is passed to subsequent receivers at block 1808.

Figure 19:
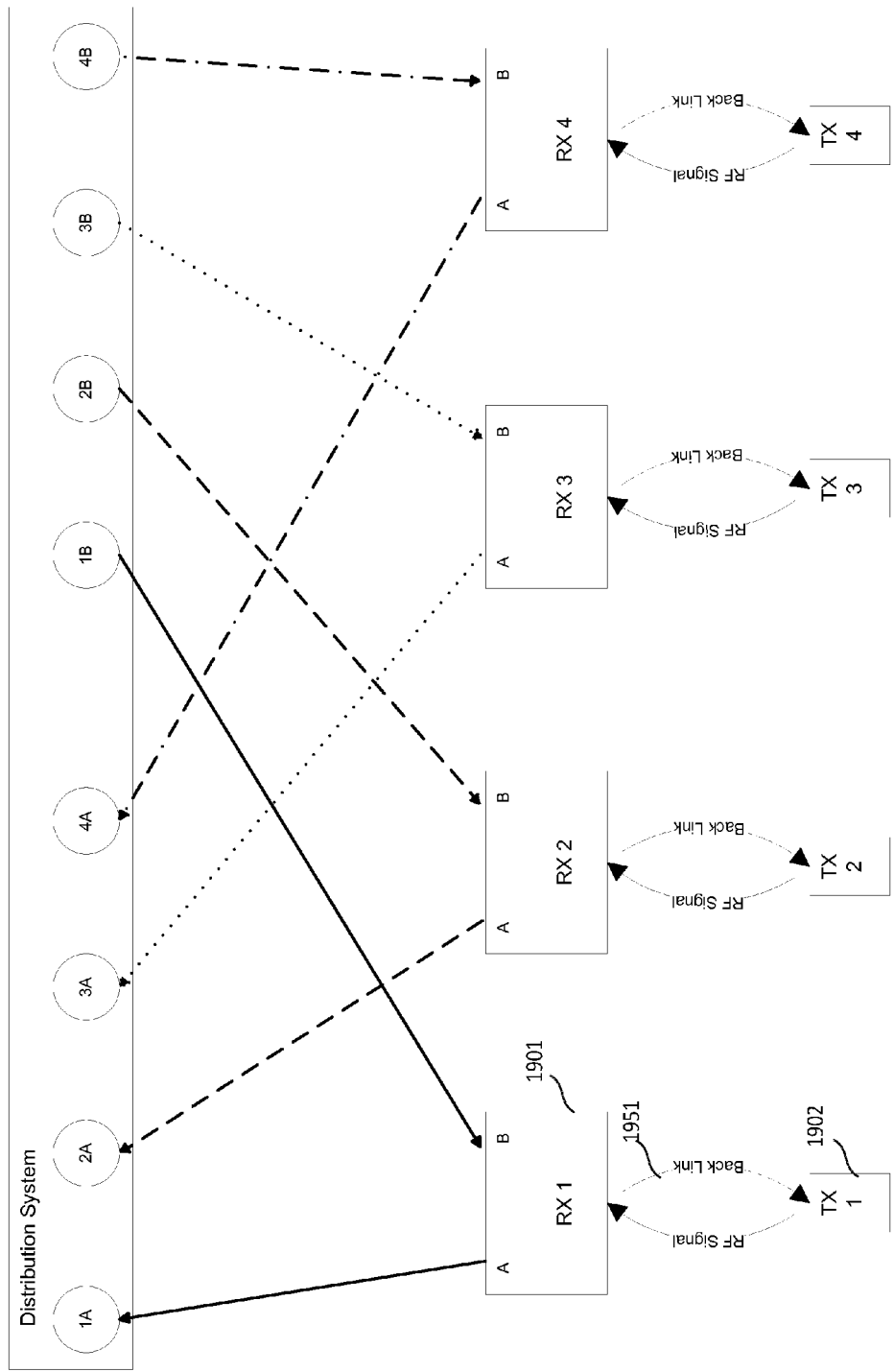
FIG. 19 shows an example for scanning an RF spectrum with a back link to a portable device in a wireless communication system in accordance with an aspect of the embodiments.

FIG. 19 shows an example for scanning an RF spectrum with back link 1951 from receiver 1901 to portable device 1902 in a wireless communication system in accordance with an aspect of the embodiments. Back link 1951 may comprise a reverse wireless channel that does not adversely affect other functionality. With back link 1951, the wireless system can scan the RF spectrum and deploy group/channel configuration not only to all receivers, but also to all transmitters, e.g. transmitter 1902. Additionally, deployment may also occur dynamically and automatically during operation.

Figure 20:
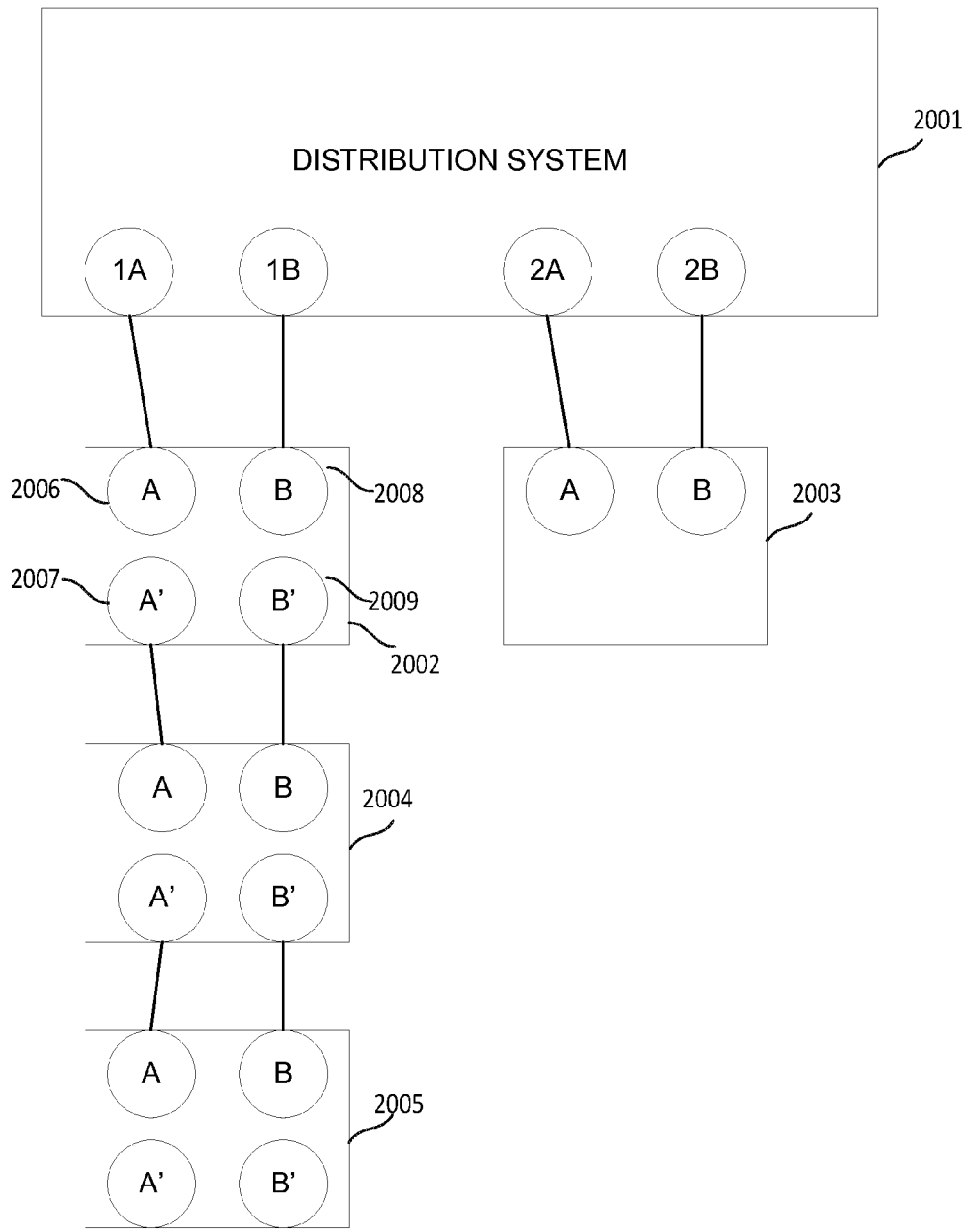
FIG. 20 shows a block diagram of a wireless communication system in which some of the receivers are cascaded in accordance with an aspect of the embodiments.

FIG. 20 shows a block diagram of a wireless communication system in which some of the receivers are cascaded in accordance with an aspect of the embodiments. Receivers 2002 and 2003 interact with distribution system 2001 in a similar manner that was previously discussed. However, additional receivers 2004-2005 are cascaded with receiver 2002. Cascading is performed by modifying signals at A-port 2006 and B-port 2008 and passing the modified signals at modified A-port 2007 and modified B-port 2009, respectively.

Figure 21:
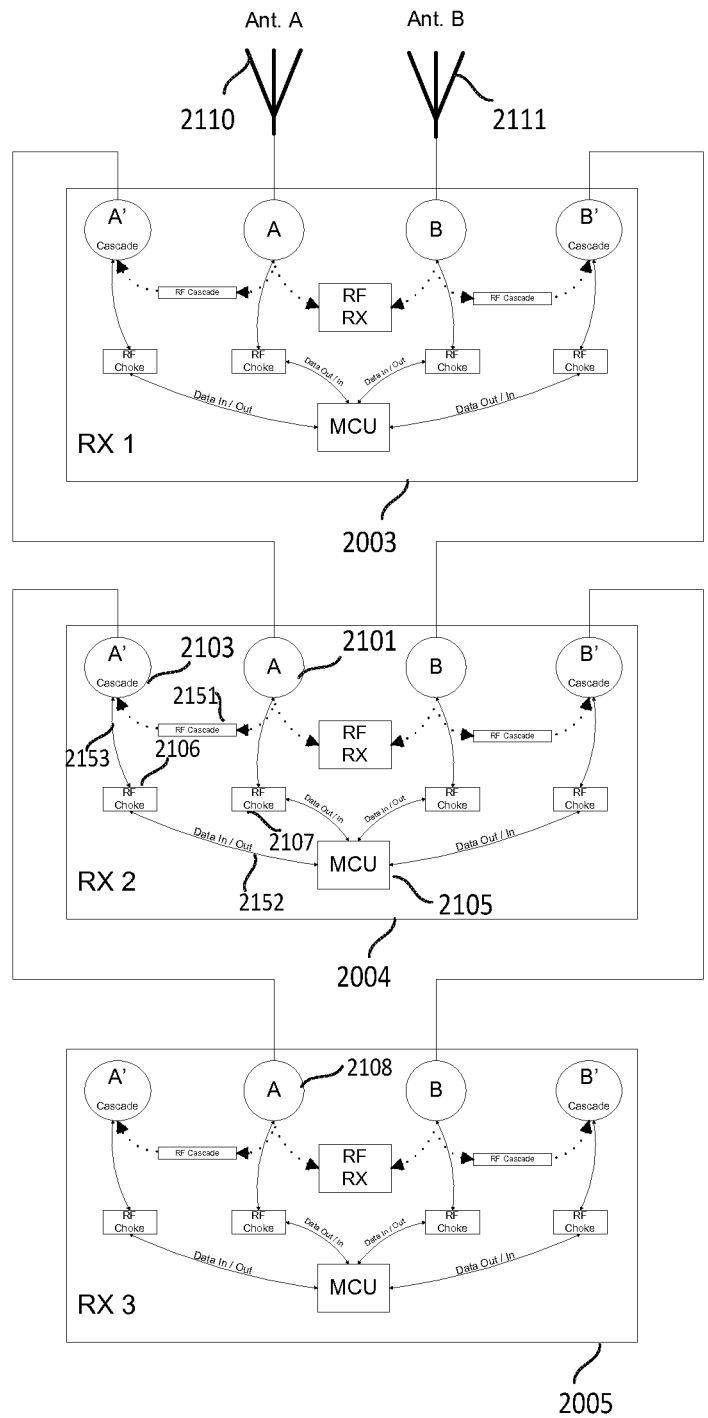
FIG. 21 shows an example of routing data between receivers through a cascaded configuration in accordance with an aspect of the embodiments.

FIG. 21 shows an example of routing data with receivers 2003-2005 through a cascaded configuration in accordance with an aspect of the embodiments. Receiver 2004 receives the RF signal from antenna 2110 and data from other receivers through A-port 2101. Signal 2151 is cascaded to modified A-port 2103 and combined with data generated by processor 2105 through paths 2152 and 2153 at modified A-port 2103, where RF chokes 2106 and 2107 provide isolation from the RF signal. The cascaded signal is consequently available at A-port 2108 for receiver 2005 to process. Consequently, the A-ports and modified A-ports provide RF connectivity from antenna 2110 while also providing bi-directional data connectivity between receivers 2003, 2004, and 2005. In a similar manner, the B-ports and modified B-ports provide connectivity from antenna 2111 while also providing bi-directional data connectivity between receivers 2005, 2004, and 2003.

Figure 22:
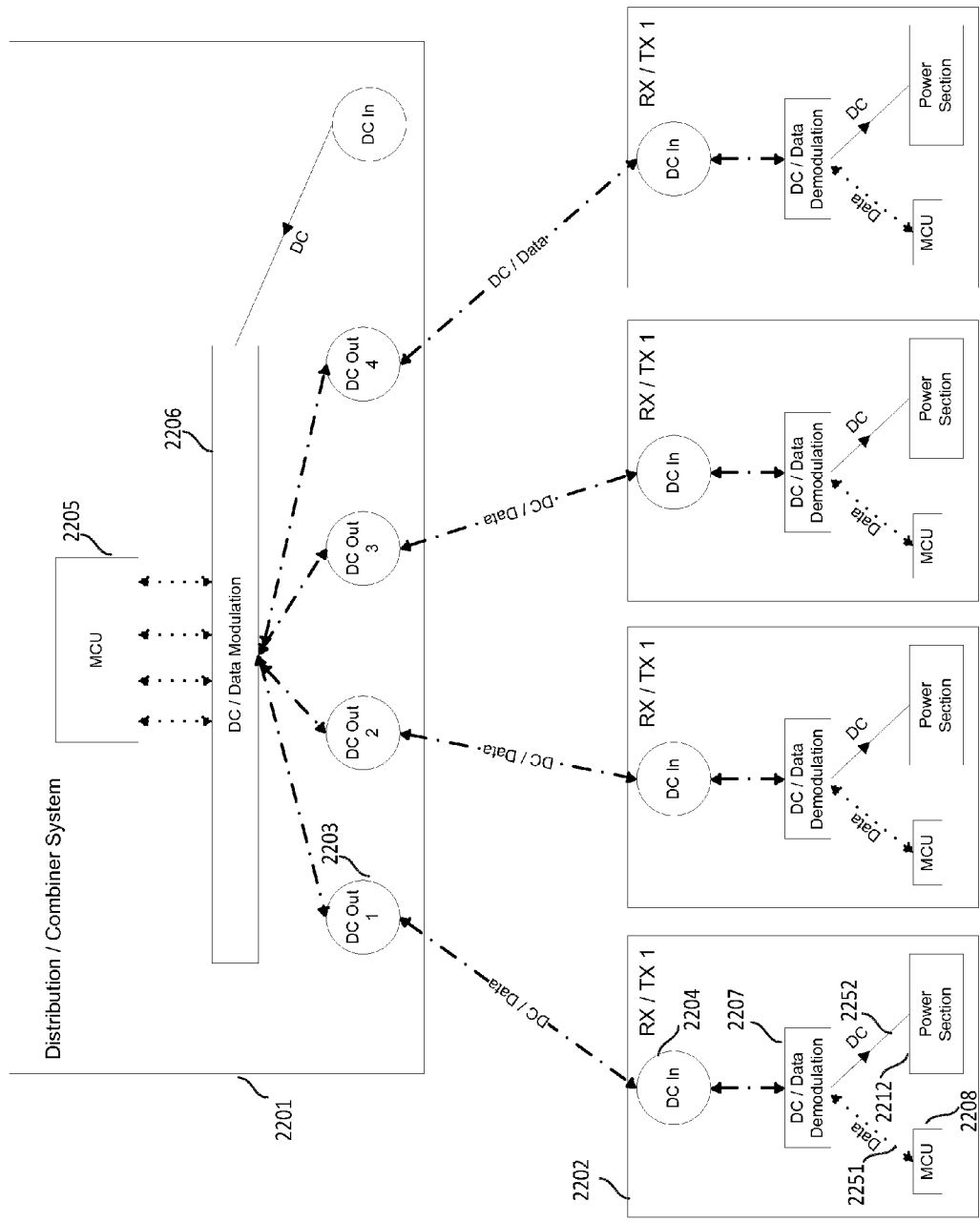
FIG. 22 shows an example of modulating the direct current (DC) level on output power connectors for networking functionality in accordance with an aspect of the embodiments.

FIG. 22 shows an example of modulating the DC level on output power connectors 2203 and 2204 for networking functionality between distribution system 2201 and RF entity 2202 (e.g., a receiver or transmitter) in accordance with an aspect of the embodiments. Modulation of DC level on the output power connectors may be used for networking functionality in a similar way as with the RF ports through A-ports and B-ports as previously discussed.

With an aspect of the disclosure, processor 2205 sends data to modulator 2206 that modulates the DC electrical power signal in accordance with the data. For example, a nominal 13.5 volt signal may be increased to 15 volts when data bit equals "1" and reduced to 12 volts when data bit equals "0." The corresponding signal at power port 2204 is demodulated by demodulator 2207, and the received data is sent to processor 2208 over path 2201. The DC signal is presented to power section 2252 to provide electrical power to RF entity 2202. Data in the reverse direction (i.e., from receiver 2202 to distribution system 2201) may be provided in a similar manner.

Figure 23:
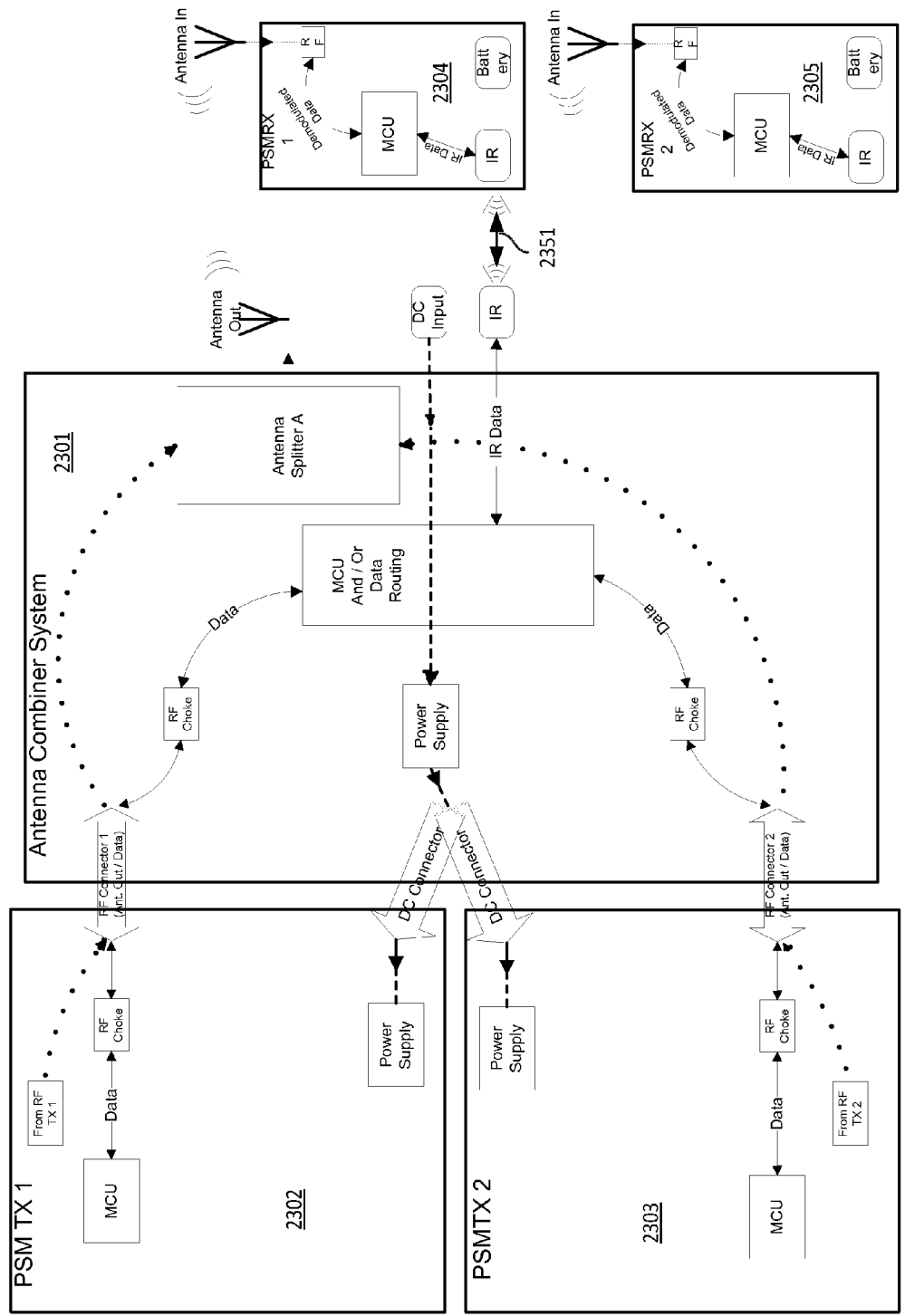
FIG. 23 shows an example of networking a system of transmitters through an antenna combiner in accordance with an aspect of the embodiments.

FIG. 23 shows an example of networking a system of transmitters 2302-2303 through an antenna combiner 2301 in accordance with an aspect of the embodiments. Rather than networking a system of receivers through a distribution system as shown in FIG. 8, antenna combiner 2301 supports wireless personal stage monitor (PSM) systems, in which transmitters 2302-2303 transmit RF signals to portable receivers 2304-2305.

Receiver 2304 may scan an RF spectrum and send scan results over infrared (IR) channel 2351 to antenna combiner 2301 so that transmitters 2302-2303 can be configured accordingly using RF ports in a similar manner as previously discussed. However, in a system such as this, data is not routed in a looped manner as shown in FIG. 10. Instead, data is sent and received directly to and from connected devices. Routing can be such that only individually targeted connected transmitters receive data or such that all connected transmitters simultaneously receive data and process the data according to the connected port assignment. Once the connected transmitters 2302-2303 have been configured, the inherent RF communication path to portable receivers 2304-2305 can be used for deployment. With some embodiments, each of transmitters 2302-2303 are paired with a portable receiver 2304-2305 by associating a unique ID from the transmitter to its paired receiver. Data modulation techniques, for example, like Amplitude Shift Keying (ASK) can be applied to an auxiliary signal like pilot tone or tone key that is radiated in transmitters 2302-2303. Portable receivers 2304-2305 would receive and demodulate the RF signal and can then also demodulate the auxiliary data. This data can contain deployment settings like frequency and lock commands, as well as identification to enable pairing of a transmitter and a receiver. Using this approach, an entire collection of multiple wireless personal stage monitor (PSM) systems may be optimally setup very quickly and easily.

With an aspect of the embodiments, data communications among different RF entities in an RF apparatus is supported through RF connections via RF ports. RF entities may include RF receivers, in-line RF signal amplifiers, integral antenna amplifiers, RF distribution amplifiers, and/or antenna array controllers. For example, data communications may convey data about the gain of an in-line RF signal amplifier, the gain of an integral antenna amplifier, filtering, gain, and configuration parameters of an RF distribution amplifier, and/or the coverage pattern of a directional antenna array.

Figure 24:
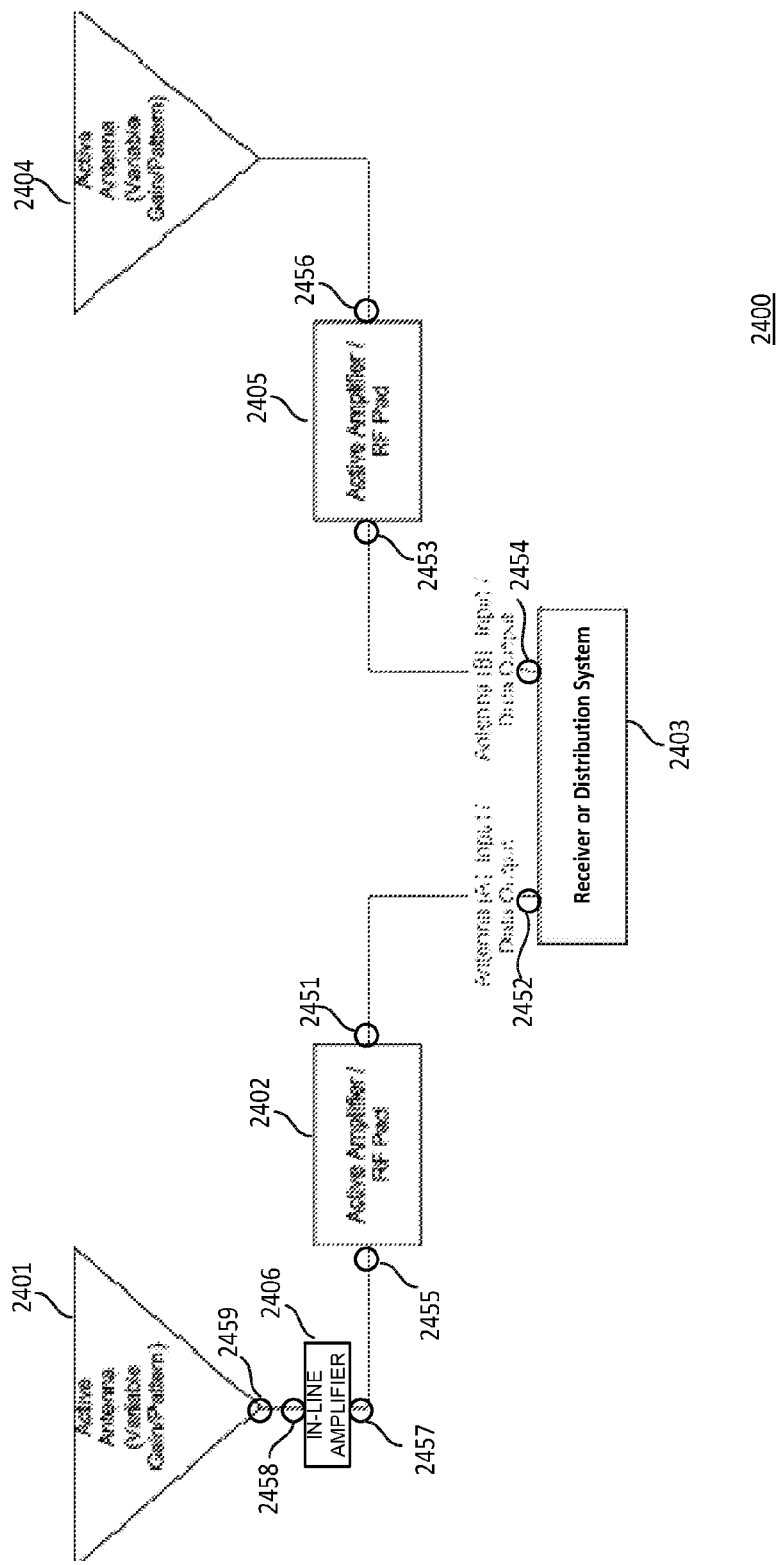
FIGS. 24-25 show RF communication systems in accordance with an aspect of the embodiments.

FIG. 24 shows RF communication system 2400 in which receiver or distribution system 2403 obtains RF signals from antennas 2401 and 2404 through active amplifiers 2402 and 2405, respectively. The RF antenna input/data output port 2452 of receiver or distribution system 2403 may be used to remotely control the behavior and performance of other RF devices (entities) that are connected along an RF chain. Receiver or distribution system 2403 may send data (e.g., a message) to active amplifier 2402 via port 2451 in order to control the amount of signal gain to be applied to a received signal. The message may also contain data for active amplifier 2402 to insert a specific amount of attenuation. Active amplifier 2402 may also send data (message) back to receiver or distribution system 2403 to provide information about current conditions and/or settings. With some embodiments, some or all of the data sent to active amplifier 2402 from receiver or distribution system 2403 may be further passed to another RF entity, e.g., in-line amplifier 2406 and/or active antenna 2401 via ports 2455, 2457, 2458, and 2459 so that the other devices can establish a communication link to receiver or distribution system 2403. For example, in-line amplifier 2406 may be inserted in a long cable run and may be controlled to vary gain from low gain to high gain in order to overcome additional cable loss that has been added to RF communication system 2400 without the need to be physically near antenna 2401.

Data passed from receiver or distribution system 2403 over an RF connection may be used to remotely control gain or attenuation settings and/or directionality of the coverage pattern of active antenna 2401. In addition, active antenna 2401 may send status data back to receiver or distribution system 2403 with parameters of its current operation, configuration, or other information pertinent to system performance.

With the some embodiments, the amount of data sent to active antenna 2401 may be reduced by including only the information required for processing by circuitry contained within active antenna 2401 itself. For example, active antenna 2401 may support variable gain settings that are remotely controlled by receiver or distribution system 2403 to reduce gain in order to achieve higher system compatibility in a harsh RF environment. This approach may enable more channels to be accommodated within a given RF spectrum without requiring redeployment of the entire number of transmitters.

Also, active antenna 2401 may adjust the coverage pattern (beam shape) in response to data from receiver or distribution system 2403 in order to avoid interference or improve RF reception of the desired signal.

With some embodiments, receiver or distribution system 2403 may be connected to an additional antenna, e.g., antenna 2404 through ports 2453, 2454, and 2456, to provide more robust reception. Corresponding data may be sent among RF entities 2403-2405 in a similar fashion as described above.

Figure 25:
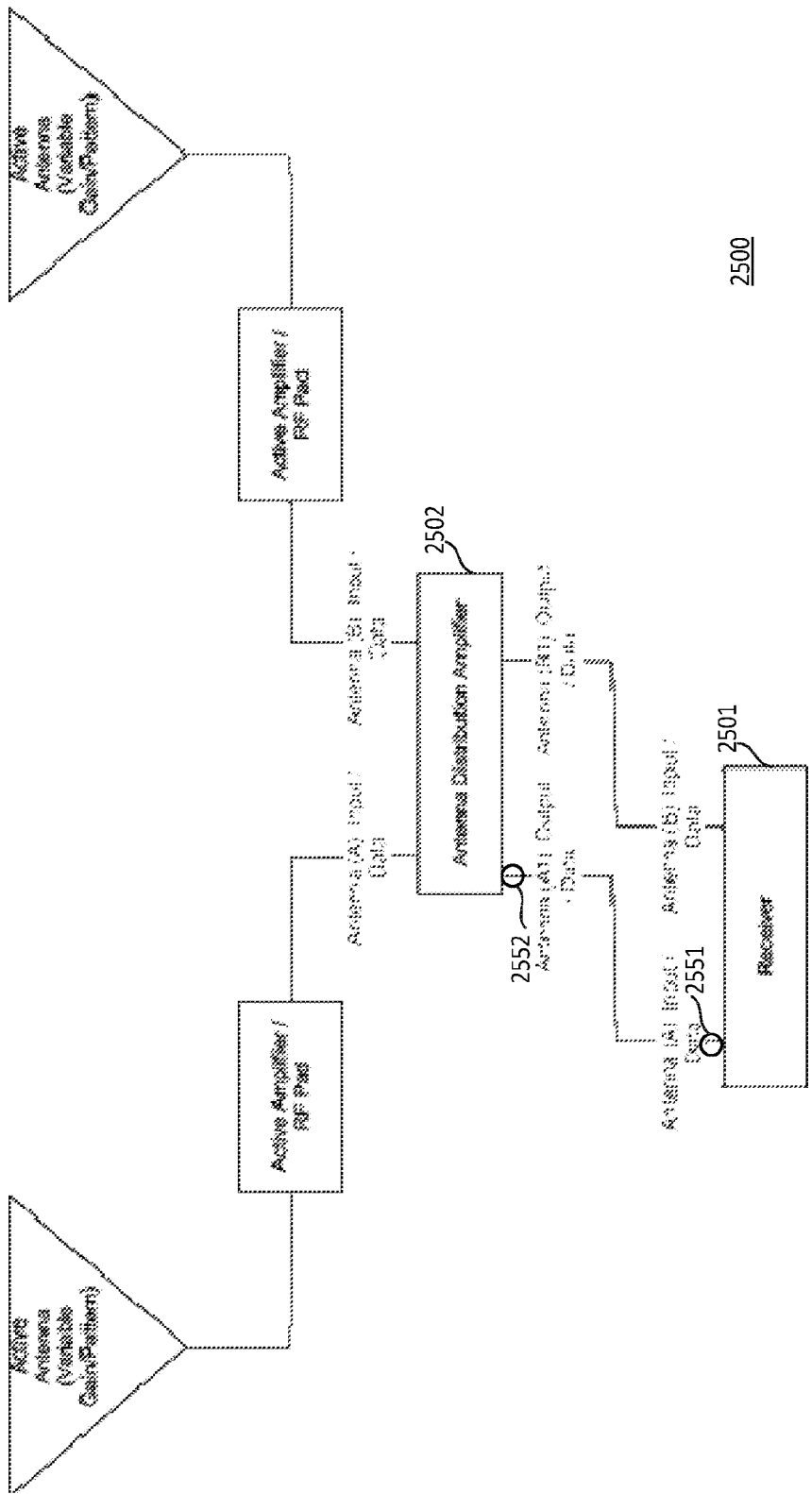

Referring to FIG. 25, data messages passed through the RF connections may also be used to remotely control the antenna distribution amplifier parameters of distribution amplifier 2502 from another RF entity, e.g., receiver 2501 through ports 2551 and 2552. For example, parameters may specify the switchable bands contained within communication system 2500. The data may also contain information regarding input/output power or control thereof. Messages may also be sent from distribution amplifier 2502 to receiver 2501 concerning overload levels. Communication from receiver 2501 to distribution amplifier 2502 (or vice versa) may allow for an intelligent and adaptive system that is controlled by a number of RF entities that are connected together. This approach may allow for system 2500 to use a wide range of simple to complex communication messages over a data network created with no additional cabling. The messages may also be sent from distribution amplifier 2502 to RF entities that are connected along an RF chain in a similar fashion as explained above. For example, distribution amplifier 2502 may control an in-line amplifier, active antenna or other in-line device.

While some exemplary embodiments may incorporate an active antenna and/or amplifier as shown in FIGS. 24 and 25, some embodiments may incorporate other types of RF entities.

While some embodiments have been described with respect to specific examples, other embodiments include numerous variations and permutations of the above described systems and techniques.

What is claimed is:

1. An apparatus for distributing a radio frequency (RF) signal to a plurality of receivers, the apparatus comprising:
   a plurality of ports, each port uniquely associated with a corresponding receiver and providing radio frequency (RF) connectivity to one of a plurality of antennas to the corresponding receiver when the corresponding receiver is connected, the plurality of antennas including a first antenna and a second antenna;
   a plurality of sensors detecting, from signals obtained on the plurality of ports, which receivers are connected to the apparatus;
   a logic module determining a network pathway for the detected receivers and generating a logic signal; and
   a router, based on the logic signal, routing data from a first detected receiver through all other detected receivers and back to the first detected receiver via corresponding ports of the plurality of ports.

2. The apparatus of claim 1, wherein:
   the plurality of ports comprising a plurality of A-ports and a plurality of B-ports, each A-port connecting to the first antenna and each B-port connecting to the second antenna; and
   the plurality of sensors determining the detected receivers from an obtained signal from a corresponding A-port.

3. The apparatus of claim 2, wherein the router routes the data from a first A-port of a preceding detected receiver to a next B-port of a next detected receiver.

4. The apparatus of claim 2, wherein the first antenna comprises a first diversity branch and the second antenna comprises a second diversity branch.

5. The apparatus of claim 1, further comprising:
   a processor transforming the data into a message in accordance with a selected protocol, and sending the message over a separate communications channel.

6. The apparatus of claim 5, wherein:
   the processor overriding the routing of data via the corresponding ports.

7. The apparatus of claim 1, wherein:
   the data comprises a receiver message;
   the router receiving the message from one of the detected receivers via the plurality of ports that provide the RF connectivity with the detected receivers; and
   routing the receiver message to a next detected receiver via the plurality of ports.

8. The apparatus of claim 1, wherein one of the plurality of receivers is connected to another apparatus distributing a radio frequency (RF) signal.

9. The apparatus of claim 1, further comprising:
   a data interface providing data connectivity with another apparatus distributing a radio frequency (RF) signal, wherein the data is provided to the other apparatus.

10. A method comprising:
    providing, by a distribution system, radio frequency (RF) connectivity to a plurality of receivers through a plurality of ports to a first antenna and a second antenna;
    sensing which of the plurality of receivers are connected to the distribution system to determine detected receivers;
    determining a network pathway through the distribution system for the detected receivers; and
    routing data from a first detected receiver to all other detected receivers and back to the first detected receiver via the plurality of ports.

11. The method of claim 10, wherein the plurality of ports comprising a plurality of A-ports and a plurality of B-ports and wherein each A-port connects to the first antenna and each B-port connects to the second antenna, the method further comprising:
    determining the detected receivers from an obtained signal for a corresponding A-port.

12. The method of claim 11, further comprising:
    routing the data from a first A-port of a preceding detected receiver to a next B-port of a next detected receiver.

13. A non-transitory computer-readable storage medium storing computer-executable instructions that, when executed, cause a processor to perform:
    providing radio frequency (RF) connectivity to a plurality of receivers through a plurality of ports to a first antenna and a second antenna;
    sensing which of the plurality of receivers are connected to a distribution system to determine detected receivers;
    determining a network pathway through the distribution system for the detected receivers; and
    routing data from a first detected receiver to all other detected receivers and back to the first detected receiver via the plurality of ports.

14. The non-transitory computer-readable medium of claim 13, wherein the plurality of ports comprises a plurality of A-ports and a plurality of B-ports, wherein each A-port connects to the first antenna and each B-port connects to the second antenna, and wherein the processor performs:
    determining the detected receivers from an obtained signal for a corresponding A-port.

15. The non-transitory computer-readable medium of claim 14, wherein the processor performs:

routing the data from a first A-port of a preceding detected receiver to a next B-port of a next detected receiver.

16. A receiver for receiving a radio frequency (RF) signal in a distribution system, the receiver comprising:
an A-port providing radio frequency (RF) connectivity to a first antenna via the distribution system;
a B-port providing RF connectivity to a second antenna via the distribution system;
an RF scanner; and
a processor configured to perform:
receiving received data from the distribution system via the A-port;
processing the received data to obtain processed data;
obtaining an indication to perform a scan by the RF scanner;
initiating, based on the indication, the scan by the RF scanner;
obtaining scan results from the RF scanner;
including the scan results in the processed data; and
passing the processed data to a next receiver via the distribution system through the B-port.

17. The receiver of claim 16, further comprising:
a first RF choke positioned in a first data path between the A-port and the processor; and
a second RF choke positioned in a second data path between the B-port and the processor.

18. The receiver of claim 16, the received data comprising a receiver lock message from another receiver connected to the distribution system, wherein the processor is further configured to perform:
obtaining an indication to lock at least one configuration parameter of the receiver;
locking at least one configuration parameter; and
passing the receiver lock message to a next receiver via the distribution system through the B-port.

19. The receiver of claim 16, the received data comprising a receiver unlock message from another receiver connected to the distribution system, wherein the processor is further configured to perform:
obtaining an indication to unlock at least one configuration parameter of the receiver;
unlocking the at least one configuration parameter; and
passing the receiver unlock message to a next receiver via the distribution system through the B-port.

20. The receiver of claim 16, wherein the received data includes a contained identification and wherein the processor is further configured to perform:
when the contained identification matches the identification of the receiver, performing an action specified by the received data and terminating passing the received data;
when the contained identification does not match the receiver identification and the received data comprises one of a lock and unlock command, performing the action and passing the received data to a next receiver;
when the contained identification does not match the receiver identification and the received data includes a contained band identification that matches a receiver band identification, configuring the receiver in accordance with scan data contained in the received data, and passing the received data to the next receiver; and
when the contained identification does not match the receiver identification and the received data includes the contained band identification that does not match the receiver band identification, passing the received data to the next receiver.

21. The receiver of claim 20, the receiver further comprising:
a communications interface supporting a communications channel between the receiver and a portable device, wherein the processor sends auxiliary data to the portable device via the communication interface.

22. The receiver of claim 16, the receiver further comprising:
a modified A-port;
a data pathway transporting the processed data from the processor to the modified A-port; and
the modified A-port providing RF connectivity from the first antenna to another receiver, combining the processed data with an RF signal to obtain a combined signal, and passing the combined signal to a next receiver.

23. An apparatus for distributing a radio frequency (RF) signal to a plurality of RF entities, the apparatus comprising:
a first RF entity including a first transmitter;
a second RF entity including a second transmitter;
a plurality of ports, the plurality of ports including:
a first port uniquely associated with the first RF entity and providing RF connectivity to an antenna when the first RF entity is connected; and
a second port uniquely associated with the second RF entity and providing RF connectivity to the antenna when the second RF entity is connected;
a processor sending first data and second data to the first and the second RF entity via the first RF port and the second RF port, respectively; and
wherein:
the processor receives received data and obtains the first and the second data from the received data;
the received data includes scan information about an RF spectrum;
the first data includes first configuration information and the second data includes second configuration information; and the first transmitter and
the second transmitter configures according to the first and second configuration information, respectively.

24. The apparatus of claim 23, wherein: the first transmitter and the second transmitter send deployment settings to a plurality of receivers.

25. An apparatus for distributing a radio frequency (RF) signal to a plurality of RF entities and providing direct current (DC) power to the plurality of RF entities, the apparatus comprising:
a plurality of power ports, a first power port uniquely associated with a first RF entity and providing electrical power to the first RF entity when the first RF entity is connected;
a processor obtaining data from an external data source; and
a router routing the data from the processor to the first RF entity through the first power port, wherein the data is conveyed by modulating a DC level.

26. The apparatus of claim 25, wherein:
the plurality of power ports contains a second power port; and
the router routing the data from the processor to a second RF entity through a second power port.

27. The apparatus of claim 25, wherein the first RF entity comprises a receiver.

28. The apparatus of claim 25, wherein the first RF entity comprises a transmitter.

29. An apparatus that distributes a radio frequency (RF) signal, the communication system comprising:

a plurality of ports, each port uniquely associated with a corresponding entities and providing radio frequency (RF) connectivity to one of a plurality of antennas to the corresponding entity when the corresponding entity is connected, the plurality of antennas including a first antenna and a second RF antenna;

a plurality of sensors detecting, from signals obtained on the plurality of ports, which entities are connected to the apparatus;

a logic module determining a network pathway for the detected entities and generating a logic signal; and a router, based on the logic signal, routing data from a first detected entity through all other detected entities and back to the first detected entity via corresponding ports of the plurality of ports.

30. The apparatus of claim 29, wherein:

the plurality of ports comprising a plurality of A-ports and a plurality of B-ports, each A-port connecting to the first antenna and each B-port connecting to the second antenna; and the plurality of sensors determining the detected entities from an obtained signal for a corresponding A-port.

\* \* \* \* \*